(12) United States Patent
Jiang

(10) Patent No.: US 10,627,637 B2
(45) Date of Patent: Apr. 21, 2020

(54) OPTICAL SYSTEM AND LIGHT FIXTURE USING THE SAME

(71) Applicant: Guangzhou Haoyang Electronic Co., Ltd., Guangzhou, Guangdong (CN)

(72) Inventor: Weikai Jiang, Guangdong (CN)

(73) Assignee: Guangzhou Haoyang Electronic Co., Ltd. (CN)

( * ) Notice: Subject to any disclaimer, the term of this patent is extended or adjusted under 35 U.S.C. 154(b) by 0 days.

(21) Appl. No.: 16/233,577

(22) Filed: Dec. 27, 2018

(65) Prior Publication Data

US 2019/0339537 A1 Nov. 7, 2019

(30) Foreign Application Priority Data

May 4, 2018 (CN) .......................... 2018 1 0421898
May 10, 2018 (CN) .......................... 2018 1 0443393

(51) Int. Cl.
G02B 27/09 (2006.01)
F21V 9/40 (2018.01)
F21V 8/00 (2006.01)
F21Y 115/10 (2016.01)

(52) U.S. Cl.
CPC ............ *G02B 27/0994* (2013.01); *F21V 9/40* (2018.02); *G02B 6/0005* (2013.01); *G02B 27/0961* (2013.01); *F21Y 2115/10* (2016.08)

(58) Field of Classification Search
CPC ............ G02B 27/0994; G02B 27/0961; G02B 6/0005; F21V 9/40; F21Y 2115/10
See application file for complete search history.

(56) References Cited

U.S. PATENT DOCUMENTS

| | | | | |
|---|---|---|---|---|
| 3,700,802 A | * | 10/1972 | Markin | G02F 1/135 348/790 |
| 2006/0012842 A1 | * | 1/2006 | Abu-Ageel | G02B 6/0001 385/146 |
| 2007/0291488 A1 | * | 12/2007 | Heathcock | H05B 37/0272 362/276 |
| 2008/0013911 A1 | * | 1/2008 | Jennings | G02B 6/00 385/146 |
| 2013/0101953 A1 | * | 4/2013 | Stone | F21V 5/002 433/29 |

(Continued)

*Primary Examiner* — Donald L Raleigh
(74) *Attorney, Agent, or Firm* — Lerner, David, Littenberg, Krumholz & Mentlik, LLP

(57) ABSTRACT

The present invention provides an optical system and a light fixture using the optical system, the optical system comprising a substrate, a light source mounted on the substrate and including multiple sets of light emitting arrays, a light pipe arranged corresponding to each set of the light emitting arrays, including an input surface, at least one light guiding surface and an output surface, and an optical lens. Additionally, the optical system further comprises honeycomb-like cover including multiple through holes, each through hole sleeved on each lens of the optical lens, a cross section of the through hole matching with a maximum cross section of the lens of the optical lens, and an overall shape of the through holes arranged on the honeycomb-like cover matching with that of the light source arranged on the substrate. On such configuration, uniform light spots can be achieved and light crosstalking can be effectively prevented.

19 Claims, 13 Drawing Sheets

(56) References Cited

U.S. PATENT DOCUMENTS

2013/0215636 A1* 8/2013 Angelini .............. G02B 6/0008
362/555
2015/0003061 A1* 1/2015 Brukilacchio ..... G01N 21/8806
362/237

* cited by examiner

OPTICAL SYSTEM AND LIGHT FIXTURE USING THE SAME

CROSS-REFERENCE TO RELATED APPLICATIONS

The present application claims priority from Chinese Patent Application Nos. 201810421898.8, filed May 4, 2018, and 201810443393.1, filed May 10, 2018, the disclosures of which are hereby incorporated herein by reference.

TECHNICAL FIELD

The present invention relates to an optical device, particularly relates to an optical system that are used for mixing light, homogenizing light and are capable of preventing light crosstalking, and also relates to a light fixture using the same.

BACKGROUND OF THE INVENTION

Compared with a fluorescent lamp, an LED light source, known as a new generation of light source that is energy-saving and environment-friendly, has the advantage of smaller size, lower energy consumption, longer service life and higher lighting efficiency. At present, there are many fluorescent tubes made of LED light sources on the market to replace common fluorescent tubes. The fluorescent tubes that use LED as light sources have the advantage of quick response, high brightness, stroboflash free, noise free, long service life and good versatility, which have been widely used in homes, offices, shopping malls, public places and on transportation vehicles.

In practical applications, light from multiple light sources are usually to be mixed, and each light source may emit light with a different color. Therefore, three technical issues need to be considered, that are uniform mixing of light from different light sources, collimation of light after emitted through a light pipe and light crosstalking due to interaction of light beams. Thus, it is necessary to solve the above problems.

In the prior art, U.S. Ser. No. 13/729,459 for example relates to light mixing lenses and systems, providing an optical system. The optical system comprises a plurality of light modules disposed adjacent to one another, each of the light modules comprising a light pipe for receiving light from a light source at a proximal end thereof, guiding the received light at least partially via reflections at its one or more peripheral surfaces to a distal end thereof and providing an output surface through which light exits the light pipe, the light pipe having a non-rotationally symmetric cross-section and a lens for receiving at least a portion of the light exiting the light pipe to form an output beam, wherein each of the light modules is rotated on its longitudinal axis with respect to one or more of the other light modules, and wherein the light modules are positioned and oriented with respect to one another such that an output beam of each light module at least partially overlaps with an output beam of at least another light module over a target surface so as to provide an illumination pattern on the target surface characterized by a light distribution exhibiting a reduced appearance of a cross-sectional shape of each of the light pipes and having a cross-sectional geometry different from a cross-sectional geometry of each of the light pipes.

In the invention, the light pipe is designed to be having a non-rotationally symmetric cross-section and each of the light modules is rotated on its longitudinal axis with respect to one or more of the other light modules to change the divergence of light, so that light of different wavelengths emitted from multiple light sources can be projected as a uniform light beam after passing through the optical system. Although a certain degree of light homogenizing effect can be achieved by such method, whether light of the light sources is sufficiently and uniformly mixed more depends on the light guiding surface of the light pipe or the light sources themselves. A sufficient and uniform mixing of the light beam cannot be achieved simply by changing the cross-sectional shape of the light pipe or simply by rotating each light pipe at a certain angle. Moreover, light crosstalking will occur when light beams of multiple light pipes pass through corresponding lenses, thus affecting the projecting effect.

Accordingly, there is a need for improved optical system and light fixture.

SUMMARY OF THE INVENTION

It is therefore an object of the present invention to provide an optical system that can present rich optical effects, prevent light crosstalking effectively and improve uniformity of light spots.

Another object of the present invention is to provide a light fixture that uses the optical system according to the present invention, which can prevent light crosstalking and improve uniformity of light spots.

In order to solve the above problems, an optical system is provided that includes a substrate, a light source, a light pipe and an optical lens, wherein the light source is mounted on the substrate and includes multiple sets of light emitting arrays; corresponding to each set of the light emitting arrays, a light pipe is arranged, which includes an input surface, at least one light guiding surface and an output surface. On such configuration, light emitted from the light emitting arrays can enter the light pipe via the input surface and be outputted from the output surface through light homogenizing treatment by the light guiding surface, such light out of the light pipe forming a light beam and being emitted via the optical lens. Additionally, the optical system further comprises a honeycomb-like cover that includes multiple through holes sleeved on the lens of the optical lens, wherein a cross section of the through hole matches with a maximum cross section of the lens of the optical lens, and an overall shape of the through holes being arranged on the honeycomb-like cover matches with an overall shape of the light source being arranged on the substrate.

The light source is capable of providing light of different colors. With the optical system, light of different colors or different patterns can be sufficiently and uniformly mixed and projected normally with less light loss, thereby maximizing the utilization efficiency of the light source. The light source is fixed on the substrate which can be a common fixing plate or a fixing component capable of fixing the light source.

The optical lens is an optical element made of transparent material, whose surface is a part of a sphere. It can be an optical lens or a relevant optical lens system including a concave lens, a convex lens, an objective lens, a zoom lens or other optical elements. Such optical elements are adapted to affect a common light beam and ultimately cause the light to be outputted onto a projection screen or an object for imaging. The optical lens or the optical lens system can have a property of divergence or aggregation for the common light beam that can be refracted or diffracted by a focusing optical element. The optical lens includes the lens disposed at an end of the output surface of the light pipe so that the light beam can be emitted from the lens of the optical lens after passing through the output surface of the light pipe.

The light pipe, including an input surface, at least one light guiding surface and an output surface, can be configured in various shapes. The input surface is proximal to the light emitting array and is correspondingly provided with an engagement mechanism to couple to the light emitting array to prevent loss of the light beam. The light guiding surface is a main transmission channel for the light beam. The light beam enters the light pipe from the input surface and is then outputted from the output surface after undergoing the light homogenizing treatment by the light guiding surface, and thus results a sufficiently and uniformly mixed light beam through the optical lens, which is ultimately projected to a designated area through the optical lens.

The optical system of the present invention comprises the light source fixed on the substrate which can be a common fixing plate. Since light source is coupled to the input surface of the light pipe, it can ensure that the light beam from the light source will substantially entirely enter the light pipe and a sufficient and uniform mixing of the light beam is achieved with the light pipe.

The optical system further comprises the honeycomb-like cover which makes the shape of the light spots emitted by the optical system of the present invention identical with the honeycomb-like cover at certain angles, thus achieving richer effects. Since in a certain angle range, light emitted from one lens may enter another to form vignette around the light spots, causing light crosstalking. By arranging the honeycomb-like cover with a certain height, light crosstalking thus can be effectively prevented. The honeycomb-like cover includes multiple through holes and the optical lens includes multiple optical lenses, each of the optical lenses corresponding to one light pipe, thus light of each light beam does not interfere with each other and better light effects are achieved.

Each of the through holes of the honeycomb is sleeved with a lens of the optical lens, achieving a one-to-one matching. The through hole has a certain height and the cross section thereof matches with the maximum cross section of the lens of the optical lens, thus ensuring that the whole lens of the optical lens can be accommodated in the through hole and effectively preventing light crosstalking.

The light source includes the multiple sets of light emitting arrays fixed on the substrate and at least one set light emitting arrays correspond to one light pipe. To make the distribution of the light source more reasonable and the pattern of the whole system more compact, the overall shape of the through holes being arranged on the honeycomb-like cover matches with the overall shape of the light source being arranged on the substrate, thus forming a one-to-one matching for each component and making the arrangement more compact.

Further, the part of the lens having the largest cross section is attached and fixed to the through hole seamlessly.

To reduce light loss during the light effects treatment for the light beam emitted by the light source, the part of the largest cross section of the lens is attached and fixed to the through hole seamlessly. Thus, light leakage and mutual light crosstalking will be avoided.

Further, the honeycomb-like cover includes an upper honeycomb-like cover and a lower honeycomb-like cover, wherein the lower honeycomb-like cover is proximal to the light source, and has an axial height of $h1 \geq H - L/\tan \alpha$, in which H means vertical distance between the lens of the optical lens and the output surface of the light pipe; L means half of the center distance between two light pipes; and $\alpha$ means half of a divergence angle of the output surface of the light pipe.

When light emitting angle $2\alpha$ is between 0° and 180°, $\alpha$ may be 10°, 20°, 30°, 40°, 50°, 60°, 70° or 80°, or any value between 0° and 90°, and the center distance 2L between two light pipes is between 40 mm and 100 mm, L is between 20 mm and 50 mm, wherein 2L may be 50 mm, 60 mm, 70 mm, 80 mm or 90 mm, or any value between 40 mm and 100 mm, it can achieve the technical effect of the present invention.

To further prevent light crosstalking of the light beams and ensure the formation of uniform light spots, the honeycomb-like cover has a certain height and includes the upper honeycomb-like cover proximal to the output surface of the lens of the optical lens and the lower honeycomb-like cover proximal to the light source. Since variation of both the light emitting arrays and shape of the output surface of the light pipe affect the divergence angle of the light beam, and different divergence angles of the light beams may cause different light crosstalking effects, the shape of the lower honeycomb-like cover is set based on an angle value of the divergence angle according to the present invention to effectively avoid light cross-talking.

The divergence angle of the light beam is used to measure the speed at which the light beam diverges outward from the beam waist. A light beam with a very small divergence angle, the radius of the light beam nearing a constant over a long transmission distance, for example, is called a collimated light beam. Since the larger the divergence angle of the light beam is, the higher the possibility of mutual influence between the light beams and the greater the chance of light crosstalking will be, the divergence angle of the output surface of the light pipe is measured to work out the axial height of the lower honeycomb-like cover, thereby preventing light crosstalking more effectively and accurately. Accordingly, for the above-mentioned formula of the present invention, in a case where other variables are determined, the larger the divergence angle $2\alpha$ of the output surface of the light pipe is, the smaller the $L/\tan \alpha$ is and thus the higher the axial height h1 of the lower honeycomb-like cover needs to be set; and conversely the smaller the divergence angle $2\alpha$ of the output surface of the light pipe is, the larger the $L/\tan \alpha$ will be and thus the lower the axial height h1 of the lower honeycomb-like cover needs to be set. According to the present invention, by flexible setting of the axial height of the lower honeycomb-like cover, light crosstalking can be effectively avoided and the axial height of the lower honeycomb-like cover can be minimized. Therefore, the volume of the entire optical system can also be reduced with light crosstalking avoided.

In another aspect, since the smaller the center distance between two light pipes is, the greater the possibility of mutual influence between the light beams and the greater the possibility of causing light crosstalking will be, the axial height of the lower honeycomb-like cover can be set relatively high; and conversely the larger the center distance between two light pipes is, the smaller the possibility of mutual influence between the light beams and the smaller the possibility of causing light crosstalking will be, the axial height of the lower honeycomb-like cover can be set relatively low. Accordingly, for the above-mentioned formula of the present invention, in a case where other variables are determined, the larger the center distance 2L between two light pipes is, the greater the $L/\tan \alpha$ is and therefore the lower the axial height h1 of the lower honeycomb-like cover needs to be set; and conversely the smaller the center distance 2L between two adjacent light pipes is, the smaller the L/tan α is and the higher the axial height h1 of the lower honeycomb-like cover needs to be set.

Therefore, the center distance between the light pipes is inversely proportional to the axial height h1 of the lower honeycomb-like cover, while the divergence angle 2α is proportional to the axial height h1 of the lower honeycomb-like cover. Thus, the formula in the present invention can help to prevent light crosstalking and minimize the volume of the light emitting system.

Further, the axial height of the upper honeycomb-like cover is between 8 mm and 45 mm.

The upper honeycomb-like cover disposed on an upper side of a light exiting surface of the optical lens is set with a certain height to separate each light emitting array so that it can further prevent light crosstalking.

The optical system further comprises a diffusion structure that is a frosted surface structure disposed on the output surface of the light pipe or is a diffuser disposed between the output surface of the light pipe and the lens.

When light of different wavelengths is irradiated directly, color separation may be obvious. In order to make the light beams mixed more uniformly, the optical system is provided with a diffusion structure according to the present invention, which is disposed on the output surface of the light pipe to allow the light pass through the diffusion structure after being uniformly mixed by the light pipe, thereby further making the light color mixed uniformly and presenting uniform white light with better soft light dyeing effects.

The diffusion structure may be a diffuser disposed on the output surface of the light pipe, or that the output surface of the light pipe is made into a frosted surface directly, so as to achieve uniform mixing.

Further, the light emitting array deflects at a certain angle with respect to at least one set of other light emitting arrays, such that after light beam of the light source is treated by the light pipe, a plurality of light beams emitted have an offset and generates uniform light spots.

To achieve a better light homogenizing effect, the light emitting array is configured to be deflected at a certain angle with respect to at least one set of other light emitting arrays. The light source of the present invention includes multiple sets of the light emitting arrays, each of which is relatively angled, so that the formation of different light confluence effects is allowed. According to the present invention, the light is deflected right from the source, such that light of different colors can have a better mixing after confluence and the light beams can be emitted as uniform light beams.

The deflection means that there is a certain deflection angle between two or more sets of the light emitting arrays. The light emitting array can emit light of multiple wavelengths or of various shapes, when there is a certain deflection angle between the light emitting arrays, the light beams can be sufficiently and uniformly mixed without changing the shape or structure of the light pipe.

Further, the light emitting arrays are arranged in the same direction.

In some embodiments of the present invention, all of the light emitting arrays can be arranged in the same direction, that is, there is no angular deflection between multiple of the light emitting arrays. However, all of the light emitting arrays can be arranged at a same deflection angle.

Further, at least a portion of the light guiding surface of the light pipe is provided with a twist structure, such that a plurality of light beams emitted from the light source can generate uniform light spots after the light source is treated by the light pipe having the twist structure.

Since the light guiding surface is the main transmission channel for the light beams, the effect of light mixing can be directly improved by improving the light guiding surface. According to the present invention, at least a portion of the light guiding surface of the light pipe is provided with a twist structure. Under a same height condition, the path for the light beam to pass the light pipe becomes longer and the number of total reflection gets larger after the light pipe is twisted, contributing to a uniform light mixing.

When the light pipe is the twist structure, or at least a portion of the light guiding surface is provided with the twist structure, the twist structure is an axial twist structure where the light guiding surface is at a certain angle with respect to a light axis.

The light pipe may be an overall axial twist structure, or only portion of the light guiding surface of the light pipe is axial twist structure. The light axis is an axis of the light emitting array from the input end to the output end or an axis parallel thereto, and the light axis is also called output axis of the light source. A portion of the light guiding surface can be provided with the twist structure or the entire light pipe may be the twist structure, such that the light guiding surface of the light pipe is relatively at a certain angle with respect to the light axis. The angle can be set according to the light beam mixing effect. The axial twist mode can also vary and different areas of the light pipe can be designed in the same axial twist mode or different axial twist modes.

The twist structure in the present invention is designed to be the axial twist structure such that the light source is deflected to an extent after passing the light guiding surface to allow a uniform mixing of the light beams of different wavelengths. Moreover, the output direction of the light source would not be affected by the axial twist structure and light loss of the light source can be avoided.

For the above design, there is a deflection angle of the light emitting array with respect to at least one set of other light emitting arrays when at least a portion of the light guiding surface of the light pipe is provided with the twist structure. The twist structure of the light guiding surface can be a spiral twist structure and/or textured twist structure, or a spiral twist structure and/or rib-typed twist structure. Therefore, the two modes of relative deflection of the light emitting arrays and twist structure of the light guiding surface can be combined to achieve a sufficient mixing of the light source and the combination is flexible. Any of the two modes can realize the mixing of the light source and would not cause light loss of the light source.

Further, the input surface of the light pipe can be in any shape. The output surface of the light pipe is a circular shape or regular 2n-side polygon, n being a natural number larger than 1.

Different from the input surface, the output surface works to make the light beams totally reflected by the guiding surface to be emitted intensively after passing through the output surface and make the emitted light beams more uniform. The shape of the output surface of the present invention is close to circular or is directly set to be circular, thus the emitted light beams will be circular or substantially circular. Further, the shape of the output surface can be set to be a regular polygon according to the needs of the user such that the light source has multiple symmetrical centers to allow easy formation of uniform light spots and different light effects can be produced to meet needs in different occasions.

Further, the input surface of the light pipe is square or rectangular.

Corresponding components that can be coupled to the input surface of the light pipe are disposed on the light source to reduce light loss of the light source. Light emitted from the light source enters the input surface. The input surface of the light pipe in the present invention has a square or rectangular cross section such that the light beams undergo total reflection multiple times inside the light pipe to present better light mixing effect.

Further, the deflection angle of one light emitting array with respect to at least one of other light emitting arrays is $0°<\beta<360°$.

Further, the deflection angle is 90° and/or 180° and/or 270°.

Further, when the light pipe is twisted, a deflection angle of the output surface of the light pipe with respect to the input surface is $\gamma$, and $0°<\gamma<90°$.

The twist structure of the light pipe can make the light beams mixed more uniformly to form uniform light spots ultimately. Preferably, when the light pipe is twisted, a deflection angle $\gamma$ of the output surface of the light pipe with respect to the input surface is $0°<\gamma<90°$.

Further, the axial twist structure is a spiral twist structure.

The spiral twist structure is a texture rotating spirally and arranged on the light guiding surface of the light pipe, or is an overall twist structure of the light pipe, either of which can increase the length of the light guiding surface and improve uniformity.

Further, the axial twist structure is a rib-typed twist structure.

The rib-typed twist structure is a twist structure with rib texture disposed on the light guiding surface where the rib protrudes form the light guiding surface by a certain height. After the light source enters the light pipe, a portion of the light beams of different colors or patterns will be emitted on the protruded rib, resulting in total reflection of light beams from the same light source on the light guiding surface, and the twist direction of the rib takes the light axis as center, so the light beams will finally be guided to exit the light pipe after being mixed mutually, with an extremely less or zero loss of the light energy.

Further, the rib-typed twist structure is in form of a spiral twist in a direction from the input end to the output end of the light source.

In order to make the light beams undergo total reflection multiple times and be sufficiently mixed, the rib-typed twist structure is arranged on the light guiding surface according to the present invention, which can be partially or totally sleeved on the light guiding surface. While the spiral twist mode can guide the light beam along the light axis to emit toward the output direction of the light source.

Further, a deflection angle $\delta$ of the rib with respect to the light axis ranges from 0° to 90°.

The deflection angle of the rib and the light axis directly decides the distribution density of the rib on the light guiding surface. And the distribution density of the rib affects the number of deflection of the light beams and the deflection direction, So that an overly large or small distribution density will directly affect light emission efficiency and light mixing effect. Therefore, the deflection angle $\delta$ is between 0° and 90° according to the present invention to achieve a sufficient and uniform mixing of the light source under the premise of ensuring the light emission efficiency.

Further, the height of the twist structure is approximately half of the total length of the light guiding surface.

The height of the twist structure refers to the height of the twist portion on the light guiding surface and also represents the area of the rib covering the light guiding surface. The higher the height is, the better the light mixing effect will be. But since the light beams are sufficiently mixed with a set height, a higher height than the set height will increase the production cost, thus the height of the twist structure is set to be approximately half of the total length of the light guiding surface according to the present invention.

Further, an overall shape of the multiple light emitting arrays arranged on the substrate is triangle, square, rectangular, regular hexagonal, regular octagonal, circular or substantially circular, and the overall shape of the through holes arranged on the honeycomb-like cover is triangle, square, rectangular, regular hexagonal, regular octagonal, circular or substantially circular.

The multiple light emitting arrays are arranged to form various geometric figures. There are three possible embodiments.

Firstly, when at least a portion of the light guiding surface is provided with the twist structure, the deflection angles of the multiple light emitting arrays with respect to the light axis are the same, that is, there are no deflection angle between the multiple light emitting arrays and the multiple light emitting arrays are arranged to form various geometric figures. In such arrangement, the light beams are finally mixed together after being deflected inside the light pipe and achieve a uniform mixing effect of the light source.

Secondly, When the light guiding surface of the light pipe is not twisted, the deflection angles of the multiple light emitting arrays with respect to the light axis are different, that is, the multiple light emitting arrays are at different deflection angles to each other, and the multiple light emitting arrays are arranged to form various geometric figures. In such arrangement, the emission angles of the light beams with different wavelengths are different and the light beams are deflected from each other after being emitted by the light pipe, thus achieving a sufficient and uniform mixing of the light beams.

Thirdly, when at least a portion of the light guiding surface of the light pipe is provided with the twist structure, the deflection angles of the multiple light emitting arrays with respect to the light axis are different, that is, the multiple light emitting arrays are at different deflection angles to each other, and the multiple light emitting arrays are arranged to form various geometric figures. Under the three conditions, an even better light mixing effect can be achieved.

Accordingly, no matter which configuration is set, a good and uniform mixing of the light beams can be achieved.

Further, the axial twist structure is a textured twist structure.

The textured twist structure is the twist structure with various twist forms arranged on the light guiding surface, such as a lateral twist or a vertical twist, all falling within the scope of protection of the present invention. By arranging the texture, a portion of the light beams can be deflected when passing the light guiding surface, thereby achieving a uniform mixing of the light beams.

The textured twist structure and the twist structure of the light guiding surface can be implemented in two embodiments separately or can be implemented in one embodiment. Each can achieve a uniform mixing of the light.

Further, the textured twist structure is that a structure with twist texture is arranged on the light guiding surface in a direction from the input end of the light source to the output end of the light source.

The twist texture structure can be a structure with spiral twist texture such that the light guiding surface has spirally rising texture in the direction from the input end of the light source to the output end of the light source. The texture is different from the rib in that the texture is mainly distributed on the surface of the light guiding surface. Generally speaking, the texture of the surface of an object is uneven grooves presented on the surface of the object. To produce grooves, actually it is adoptable to have texture or patterns drawn on the surface of the light guiding surface with a sense of unevenness tactilely. Uneven patterns can be regular or irregular.

The rib is different from the texture in that the rib can be integrally formed with the surface of the light pipe or can be protrusions additionally attached to the surface of the light pipe. The protrusions of the rib are more obvious compared with the unevenness of the texture and can also play an effective role in deflecting the light beams.

Further, the twist structure of the light pipe includes a structure in which multiple light pipes are rotated at a certain angle with respect to one or more other light pipes.

According to the present invention, the light pipe not only itself has the twist structure, the light pipe is also rotated at a certain angle, so that the light beams will be better deflected, thereby achieving a more sufficient light mixing.

Further, the light emitting array is an LED chip array.

The LED chip can emit light with four different wavelengths and arrangement thereof forms a "square" shape. The LED chips G, R, B, and W of the LED chip array are green LED chip, red LED chip, blue LED chip and white LED chip, emitting green light, red light, blue light and while light respectively. To further improve the quality of the white light generated by the packed LED chips, four LED chips including a red LED chip (R), a green LED chip (G), a blue LED chip (B) and a white LED chip (W) are used. In addition, with the advancement of technology, LED chips of other colors can also achieve a uniform mixing of light. With the advancement of LED chip design, LED chips of a different number and/or a different color can also be used in the LED chip array to upgrade mixing of the light beams or to achieve different mixing effects of the light beams.

Accordingly, in some embodiments of the present invention, the light guiding surface of the light pipe itself is twisted such that the light beams of different wavelengths from the LED each can be deflected to different degrees to ultimately achieve a uniform mixing of the light beams.

When the light guiding surface of the light pipe is not provided with the twist structure, the LED chips are rotated to a certain degree with respect to at least one set of other LED chips, so the emitting angles of the light beams with different wavelengths will vary. After the light beams pass through the light pipe, the light beams with different wavelengths will affect each other and be deflected, thereby achieving a uniform mixing of the light beams.

In addition, the light guiding surface itself of the light pipe can be twisted and the LED chips are rotated to a certain degree with respect to at least one set of other LED chips, so the light beams with different wavelengths from the LED each can be deflected to a certain degree after entering the light pipe and the emitting angles of the light beams with different wavelengths will vary. After the light beams are deflected when passing through the light pipe, the light beams with different wavelengths will affect each other to be offset due to the difference of emitting angles, thereby achieving a uniform mixing of the light beams.

Further, the output surface of the light pipe is a circular or substantially circular shape.

Different from the input surface, the output surface works to make the light beams deflected when passing the light guiding surface to be emitted intensively after passing through the output surface and make the emitted light beams more uniform. In some embodiments of the present invention, the output surface is substantially circular or is directly set to be circular, making the emitted light beams more uniform.

Further, the cross sectional area of the light pipe increases gradually from the input surface to the output surface.

Since the cross sectional area of the light pipe increases with the distance from the input surface of the light increasing, the light pipe can be designed in segment or in integration. When designed in segment, each cross section of each segment can hold different shapes and/or cross sectional area; and when designed in integration, the light pipe can generally change from large to small, to achieve concentration of light.

According to the present invention some desirable effects can be obtained. (1) By arranging the honeycomb-like cover with a certain height, light crosstalking can be effectively prevented. Each of the through holes of the honeycomb is sleeved on one of the optical lenses, achieving a one-to-one matching, and the entire lens of the optical lens can be accommodated inside the through hole, which can further effectively prevent light crosstalking.

(2) The distance between the light pipes is inversely proportional to the axial height h1 of the lower honeycomb-like cover, while the divergence angle 2α is proportional to the axial height h1 of the lower honeycomb-like cover. The formula $h1 \geq H - L/\tan\alpha$ according to the present invention can prevent light crosstalking purposefully and minimize the volume of the light emitting system.

(3) According to the present invention, the light is deflected right from the source, such that light of different colors or patterns can have a better mixing after confluence and the light beams can be emitted as uniform light beams.

(4) The light pipe in the present invention is designed to be the axial twist structure such that the light source is deflected to a certain degree after passing the light guiding surface to allow a uniform mixing of the light beams with different wavelengths. Moreover, the light source output direction would not be affected by the axial twist, which can avoid light loss of the light source.

DESCRIPTION OF THE EMBODIMENTS

Figure 1:
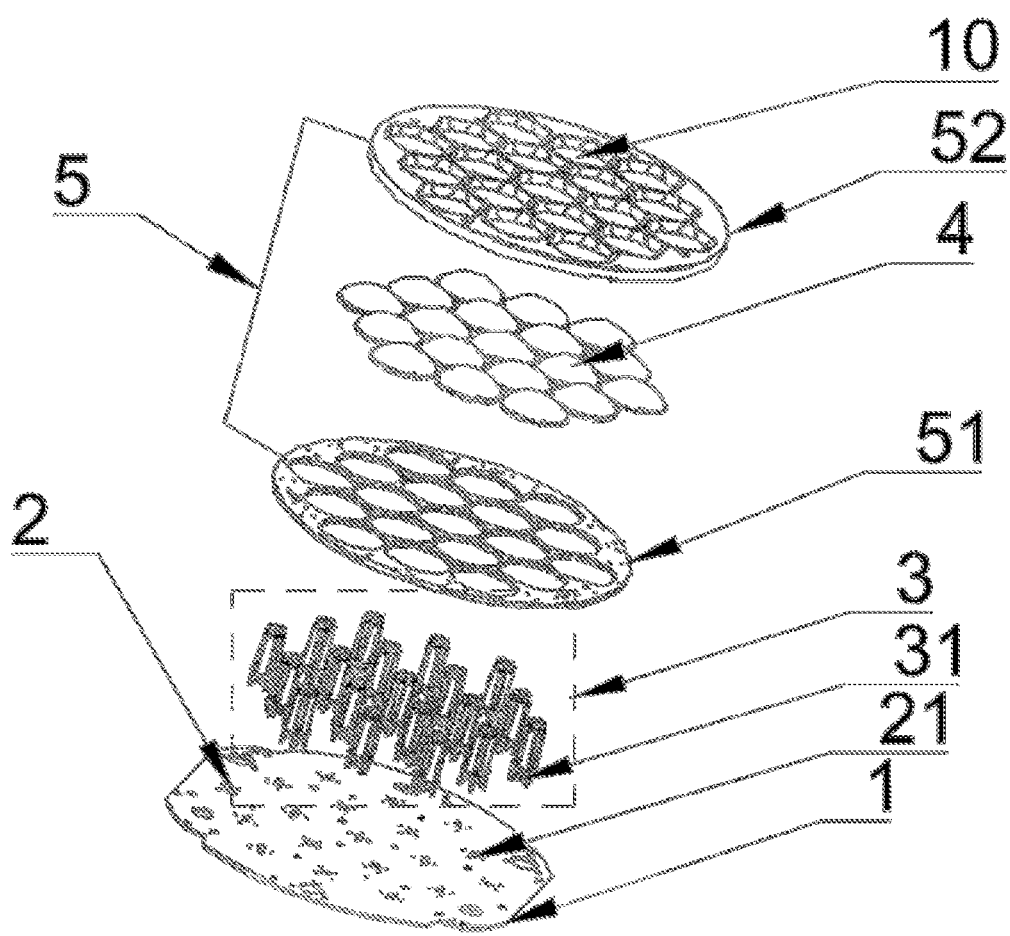
FIG. 1 is an exploded view of an optical system of the present invention.

In order to make the objects, the technical solutions and the advantages of the present invention more clearly, the technical solutions according to the embodiments of the present invention will be described in detail below with reference to the accompanying drawings. In the accompanying drawings, the same or similar reference numerals denote the same or similar elements or elements having the same or similar functions throughout. The embodiments described are only a part of embodiments of the present invention, and are not all embodiments thereof. The following embodiments described with reference to the accompanying drawings are illustrative and only used to explain the present invention, but may not be interpreted as the restrictions of the present invention. All other embodiments obtained by those skilled in the art based on the embodiments of the present invention without creative efforts are within the scope of the present invention. The embodiments of the present invention will be described in detail below with reference to the accompanying drawings.

Embodiment 1

Figure 2:
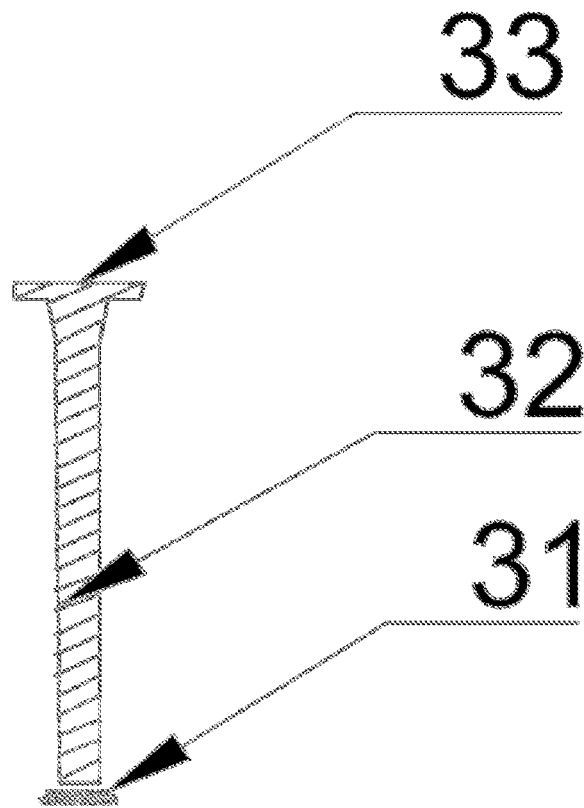
FIG. 2 is a cross-sectional view of a light pipe of the present invention.

In one exemplary embodiment, the present invention discloses an optical system, as shown in FIG. 1 and FIG. 2, comprising a substrate 1, a light source 2, a light pipe 3 and an optical lens 4, wherein the light source 2 is mounted on the substrate 1 and includes multiple sets of light emitting arrays 21, corresponding to each set of the light emitting arrays 21, a light pipe 3 is arranged, which includes an input surface 31, at least one light guiding surface 32 and an output surface 33. Light emitted from the light emitting arrays 21 can enter through the input surface 31 of the light pipe 3 and is outputted from the output surface 33 through light homogenizing treatment by the light guiding surface 32, such light out of the light pipe forming a light beam and being emitted via the optical lens 4. Additionally, the optical system further comprises a honeycomb-like cover 5 that includes multiple through holes 10 sleeved on the lens of the optical lens 4. A cross section of the through hole 10 matches with a maximum cross section of the lens of the optical lens 4, and an overall shape of the through holes 10 being arranged on the honeycomb-like cover 5 matches with an overall shape of the light source 2 being arranged on the substrate 1.

The light source 2 is capable of providing light of different colors or different patterns. With the optical system, light of different colors or different patterns can be sufficiently and uniformly mixed and projected normally with less light loss, thereby maximizing the utilization efficiency of the light source. The light source 2 is fixed on the substrate 1 which can be a common fixing plate or a fixing component capable of fixing the light source 2.

The optical lens 4 is an optical element made of transparent material, whose surface is a part of a sphere. It can be a lens or a relevant optical lens system including a concave lens, a convex lens, an objective lens, a zoom lens or other optical elements. The optical elements are adapted to affect a common light beam and ultimately cause the light to be outputted onto a projection screen or object for imaging. The optical lens or the optical lens system may have a property of divergence or aggregation for the common light beam that can be refracted or diffracted by a focusing optical element. The optical lens 4 includes the lens that is disposed at an end of the output surface of the light pipe such that the light beam is emitted from the lens of the optical lens 4 after passing through the output surface of the light pipe 3.

The light pipe 3 may be configured in various shapes and includes an input surface 31, at least one light guiding surface 32 and an output surface 33. The input surface 31 is proximal to the light emitting array 21 and is correspondingly provided with an engagement mechanism to couple to the light emitting array 21 to prevent loss of the light beam. The light guiding surface 32 is a main transmission channel for the light beam. Light of the light source 2 enters the light pipe 3 from the input surface 31 and is then outputted from the output surface after undergoing the light homogenizing treatment by the light guiding surface 32, and thus results a sufficiently and uniformly mixed light beam through the optical lens 4, which is ultimately projected to a designated area through the optical lens 4.

The optical system of the present invention comprises the light source 2 fixed on the substrate 1 which can be a common fixing plate. Since the light source 2 is coupled to the input surface 31, the light beam emitted from the light source 2 is substantially entirely introduced into the light pipe 3 and a sufficient and uniform mixing of the light beam is achieved with the light pipe 3.

According to this embodiment, the honeycomb-like cover 5 is configured so that the shape of the light spots emitted by the optical system of the present invention is identical with the honeycomb-like cover 5 at certain angles, thus achieving richer effects. Since in a certain angle range, light from one lens may enter another to form vignetting around the light spots, causing light crosstalking. By arranging the honeycomb-like cover 5 with a certain height, light crosstalking can be effectively prevented. The honeycomb-like cover 5 includes multiple through holes 10 and the optical lens 4 includes multiple micro optical lenses 4, each of the micro optical lenses 4 corresponding to one light pipe 3, thus light of each light beam does not interfere with each other and better light effects are achieved.

Each of the through holes 10 of the honeycomb-like cover 5 is sleeved with a lens of the optical lens 4, achieving a one-to-one matching. The through hole 10 has a certain cross sectional area and is close to circular, and the size of the cross sections thereof matches with the maximum cross section of the lens of the optical lens 4, thus ensuring that the whole lens of the optical lens 4 can be accommodated in the through hole 10 and effectively preventing light crosstalking.

The light source 2 includes the multiple sets of light emitting arrays 21 fixed on the substrate 1 and at least one set light emitting arrays 21 correspond to one light pipe 3. To make the distribution of the light source 2 more reasonable and the whole system more compact, the overall shape of the through holes 10 being arranged on the honeycomb-like cover 5 matches with the overall shape of the light source 2 being arranged on the substrate 1, thus forming a one-to-one matching for each component and making the arrangement more compact.

Further, the part of the largest cross section of the lens is attached and fixed to the through hole 10 seamlessly.

To reduce light loss during the light effects treatment for the light beam emitted by the light source 2, the part of the largest cross section of the lens is attached and fixed to the through hole 10 seamlessly. Thus, light leakage or the effects of crosstalk can be avoided.

Figure 3:
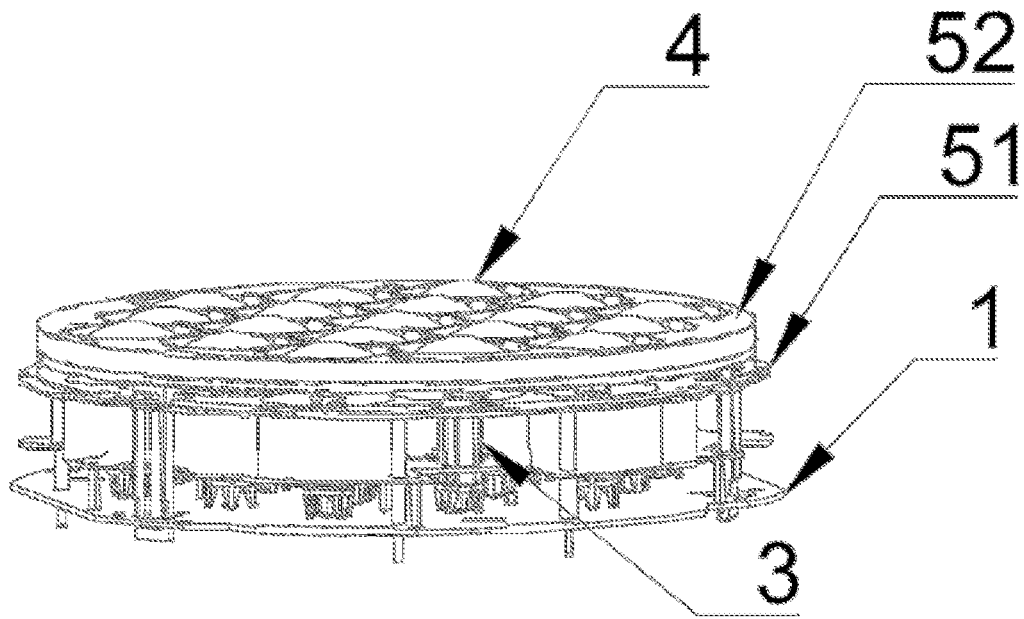
FIG. 3 is a schematic view of the optical system of the present invention.
Figure 12:
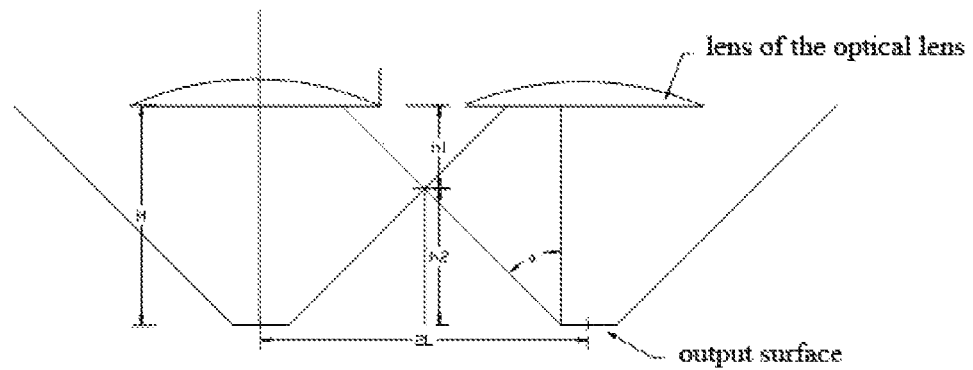
FIG. 12 is a diagram showing a calculation formula of a honeycomb-like cover.

Further, as shown in FIG. 1, FIG. 3 and FIG. 12, the honeycomb-like cover 5 includes an upper honeycomb-like cover 52 and a lower honeycomb-like cover 51, the lower honeycomb-like cover 51 proximal to the light source 2 and having an axial height of h1≥H−L/tan α, in which H means vertical distance between the lens of the optical lens and the output surface of the light pipe 3; L means half of the center distance between two light pipes 3; and α means half of the divergence angle of the output surface of the light pipe 3.

When light emitting angle 2α is 120°, i.e. α=60°, the center distance between two light pipes 2L is 70 mm, i.e. L=35 mm and lens of the optical lens is at a minimum angle, the vertical distance H between lens of the optical lens and the output surface of the light pipe is 60 mm and the axial height of the lower honeycomb-like cover h1 is 39.8 mm; when the light emitting angle 2α is 120°, i.e. α=60°, the center distance between two light pipes 2L is 50 mm, i.e. L=25 mm and lens of the optical lens is at the minimum angle, the vertical distance H between lens of the optical lens and the output surface of the light pipe is 30 mm and the axial height of the lower honeycomb-like cover h1 is 15.6 mm.

In order to further prevent crosstalk between the light beams and to ensure uniform light spot formation, the honeycomb-like cover 5 of the present invention has a certain height and includes the upper honeycomb-like cover 52 proximal to the output surface of the lens of the optical lens and the lower honeycomb-like cover 51 proximal to the light source. Since variation of both the light emitting arrays and shape of the output surface of the light pipe 3 affect the divergence angle of the light beam, and different divergence angles of the light beams may cause different light cross-talking effects, the shape of the lower honeycomb-like cover 51 is configured based on the divergence angle of the output surface of the light pipe 3 according to the present invention so that light cross-talking is effectively avoided.

The divergence angle of the light beam is used to measure the speed at which the light beam diverges outward from the beam waist. A light beam with a very small divergence angle, the radius of the light beam near to a constant over a long transmission distance, for example, is called a collimated beam. Since the larger the divergence angle of the light beam is, the higher the possibility of mutual influence between the light beams is and the greater the chance of light crosstalking is, the divergence angle of the output surface of the light pipe 3 is measured to work out the axial height of the lower honeycomb-like cover 51 thereby preventing light crosstalking more effectively and accurately. Accordingly, for the above-mentioned formula of the present invention, in a case where other variables are determined, the larger the divergence angle 2α of the output surface of the light pipe 3 is, the smaller the L/tan α will be and thus the higher the axial height h1 of the lower honeycomb-like cover 51 needs to be set; and conversely the smaller the divergence angle 2α of the output surface of the light pipe 3 is, the larger the L/tan α is and the lower the axial height h1 of the lower honeycomb-like cover 51 needs to be set. According to the present invention, by flexibly setting the axial height of the lower honeycomb-like cover 51, light crosstalking can be effectively avoided and the axial height of the lower honeycomb-like cover 51 can be minimized. Therefore, the volume of the entire optical system can also be reduced with light crosstalking avoided.

In another aspect, the smaller the center distance between two light pipes 3 is, the greater the possibility of mutual influence between the light beams and the possibility of causing light crosstalking may be, thus the axial height of the lower honeycomb-like cover 51 can be set relatively high; and conversely the larger the center distance between two light pipes 3 is, the smaller the possibility of mutual influence between the light beams and the possibility of causing light crosstalking may be, so that the axial height of the lower honeycomb-like cover 51 can be set relatively low. Accordingly, for the above-mentioned formula of the present invention, in a case where other variables are determined, the larger the center distance L between two adjacent light pipes 3 is, the greater the L/tan α is and therefore the lower the axial height h1 of the lower honeycomb-like cover 51 needs to be set; and conversely the smaller the center distance 2L between the two adjacent light pipes 3 is, the smaller the L/tan α is and the higher the axial height h1 of the lower honeycomb-like cover 51 needs to be set.

Therefore, the center distance between the light pipes 3 is inversely proportional to the axial height h1 of the lower honeycomb-like cover 51, while the divergence angle 2α of the output surface 33 of the light pipe 3 is proportional to the axial height h1 of the lower honeycomb-like cover 51. Thus, the formula in the present invention can help to prevent light crosstalking and minimize the volume of the light emitting system.

Further, the axial height of the upper honeycomb-like cover 52 is 8 mm.

Further, one light emitting array 21 is configured to deflect at a certain angle with respect to at least one set of other light emitting arrays 21, such that after light of the light source 2 is treated by the light pipe 3, a plurality of light beams emitted will offset at a certain angle and generate uniform light spots.

To achieve a better light homogenizing effect, one light emitting array 21 is configured to deflect at a certain angle with respect to at least one set of other light emitting arrays 21. The light source 2 of the present invention includes multiple sets of the light emitting arrays 21, each of which is relatively angled to allow different light confluence effects. According to the present invention, the light of the light source 2 is deflected right from the source, such that light of different colors or patterns can have a better mixing after confluence and the light beams can ultimately be emitted as uniform light beams.

The deflection means that there is a certain deflection angle between two or more sets of the light emitting arrays 21. The light emitting array 21 can emit light of multiple wavelengths or of various shapes. The light emitting arrays 21 configured to deflect at a certain angle allow the light beams to be mixed sufficiently and uniformly without changing the shape or structure of the light pipe 3.

Figure 4:
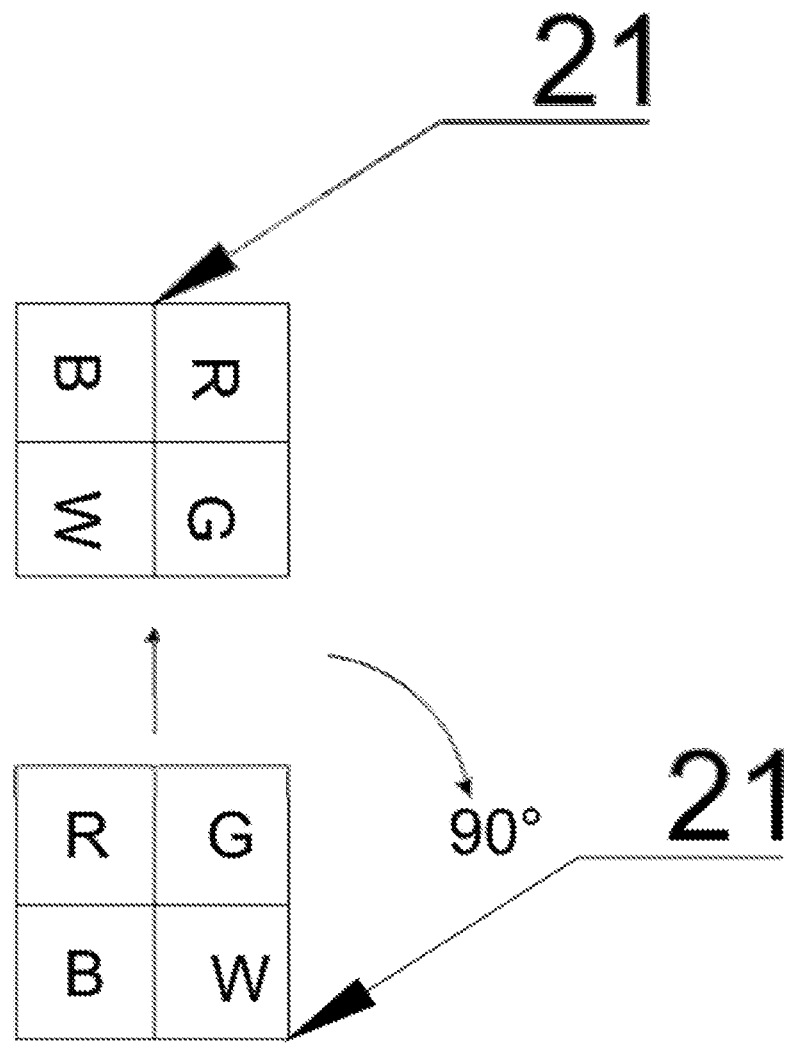
FIG. 4 is a schematic view of an LED array turned by 90°.
Figure 5:
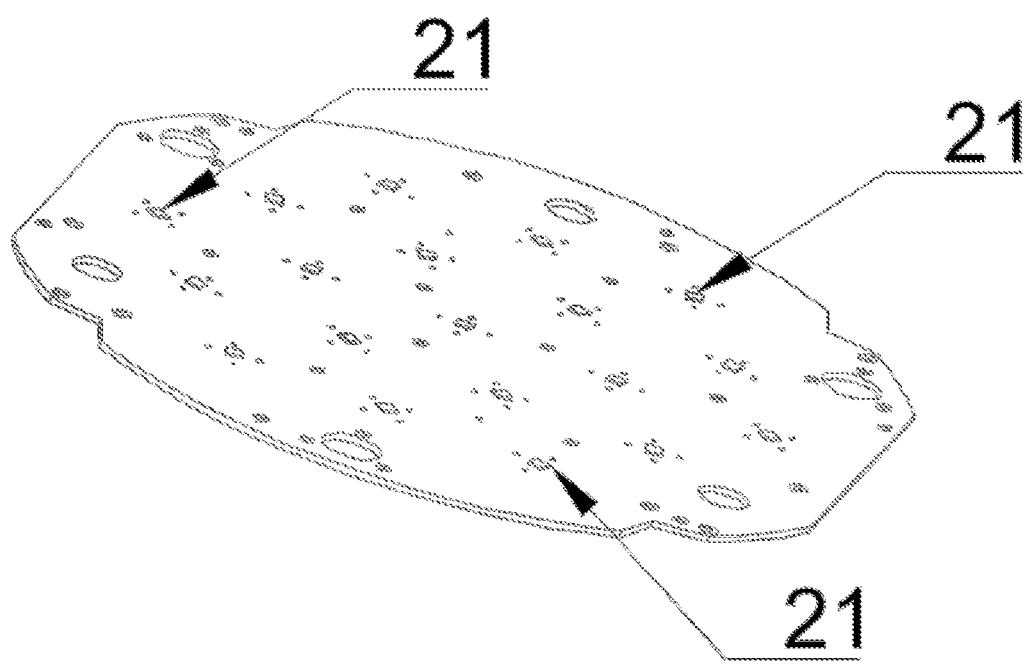
FIG. 5 is a schematic view of a light source disposed on a substrate.

Further, as shown in FIG. 4 and FIG. 5, the light emitting array 21 can deflect at an angle of 90° with respect to at least one set of other light emitting arrays 21.

The deflection of the light emitting array 21 allows the light beam to be emitted on the light guiding surface 32 after the light being deflected, and then the light beam can be further deflected by the light guiding surface 32, thus achieving a uniform mixing of the light beam. The light emitting array 21 has an arbitrary deflection angle and can form various deflection arrangements, making richer effects for the overall light spots.

Further, as shown in FIG. 5, the light emitting arrays 21 are arranged in form of oval.

Further, the input surface 31 of the light pipe 3 can be in any shape. The output surface 33 of the light pipe 3 is circular.

Different from the input surface 31, the output surface 33 works to make the light beams deflected when passing the guiding surface 32 to be emitted intensively after passing through the output surface 33 and make the emitted light beams more uniform. The shape of the output surface 33 of the present invention is close to circular or is directly set to be circular, making the emitted light beams more uniform. Further, the output surface can be set to be a regular polygon according to the needs of the user such that the light source 2 has multiple symmetrical centers to allow easy formation of uniform light spots and different light effects can be produced to meet needs in different occasions.

Further, the light emitting arrays 21 are LED chip arrays.

The LED chip can emit light with four different wavelengths and arrangement thereof forms a "square" shape. The LED chips G, R, B, and W of the LED chip array are green LED chip, red LED chip, blue LED chip and white LED chip, emitting green light, red light, blue light and while light respectively. To further improve the quality of the white light generated by the packed LED chips, four LED chips including a red LED chip (R), a green LED chip (G), a blue LED chip (B) and a white LED chip (W) are used. In addition, with the advancement of technology, LED chips of other colors can also achieve a uniform mixing of light. With the advancement of LED chip design, LED chips of a different number and/or a different color can also be used in the LED chip array to upgrade mixing of the light beams or to achieve different mixing effects of the light beams.

In the embodiment of the present invention, the LED chips are rotated to a certain degree with respect to at least one set of other LED chips, so the emitting angles of the light beams with different wavelengths will vary. After the light beams pass through the light pipe 3, the light beams with different wavelengths will affect each other and be deflected, thereby achieving a uniform mixing of the light beams.

Figure 6:
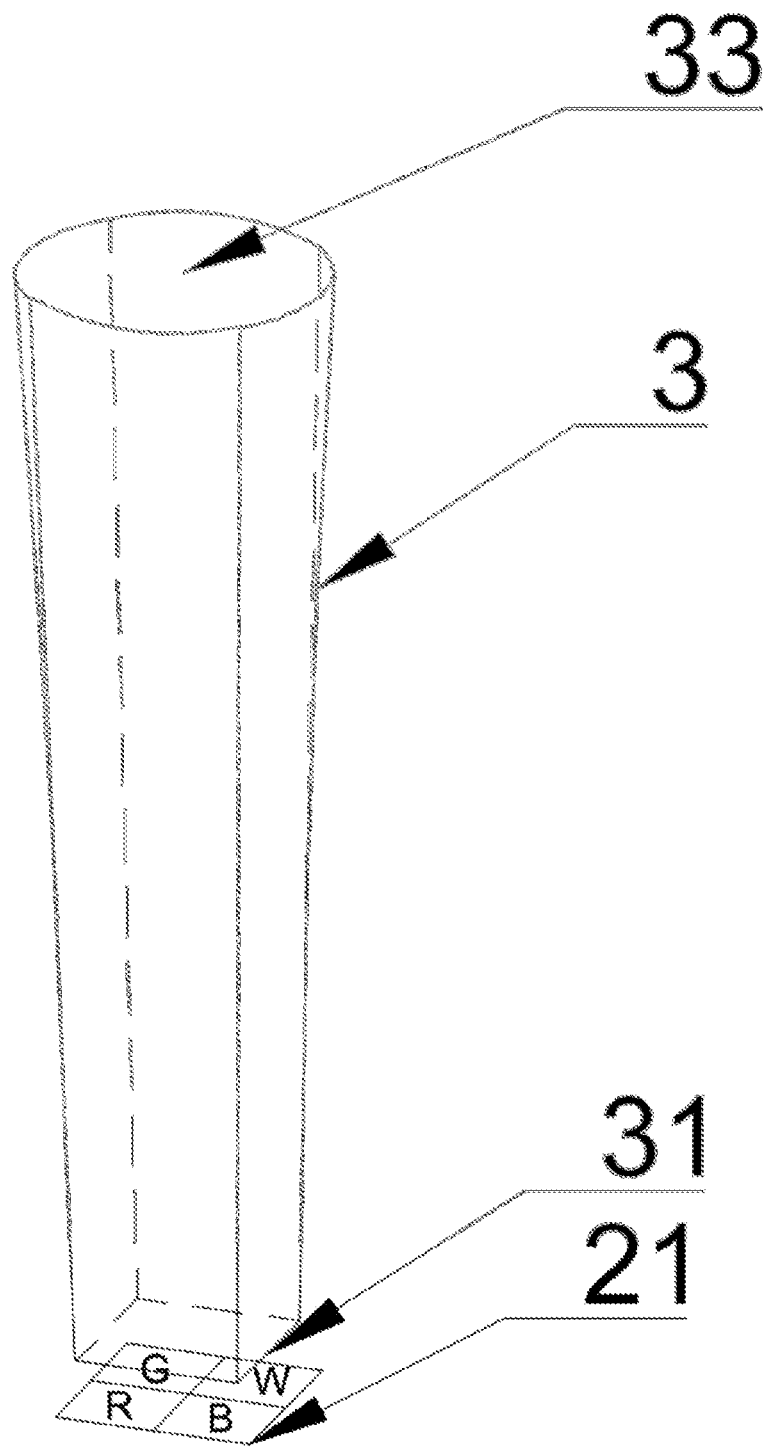
FIG. 6 is a schematic view of the light pipe in conjunction with a light emitting array.

Further, as shown in FIG. 6, the input surface 31 of the light pipe 3 is square.

Corresponding components that can be coupled to the input surface 31 of the light pipe 3 are disposed on the light source 2 to reduce light loss of the light source 2. Light of the light source 2 enters the input surface 31 after being emitted. The input surface 31 of the light pipe 3 is preferably in irregular shapes such that light of the light source 2 can be deflected to different degrees after entering the input surface 31, while the closer to circular for the shape of the cross section of the input surface 31 of the light pipe 3, the smaller the deflection angle of the light beam will be, causing that a uniform mixing of the light beams cannot be achieved. Therefore, the input surface 31 of the light pipe 3 has a square or rectangular cross section such that the light beams are deflected in the light pipe 3 to present better light mixing effects.

Further, as shown in FIG. 6, the output surface 33 of the light pipe 3 is circular.

Different from the input surface 31, the output surface 33 works to make the light beams deflected when passing the light guiding surface 32 to be emitted intensively after passing through the output surface 33 and make the emitted light beams more uniform. In some embodiments of the present invention, the output surface 33 is substantially circular or is directly set to be circular, making the emitted light beams more uniform.

Further, as shown in FIG. 6, the area of cross section of the light pipe 3 increases gradually from the input surface 31 to the output surface 33.

Since the area of cross section of the light pipe 3 increases with the distance from the input surface of the light increasing, the light pipe 3 can be designed in segment or in integration. When designed in segment, each cross section of each segment can hold different shapes and/or cross sectional area; and when designed in integration, the light pipe 3 can generally change from large to small, to achieve concentration of light.

Embodiment 2

Figure 7:
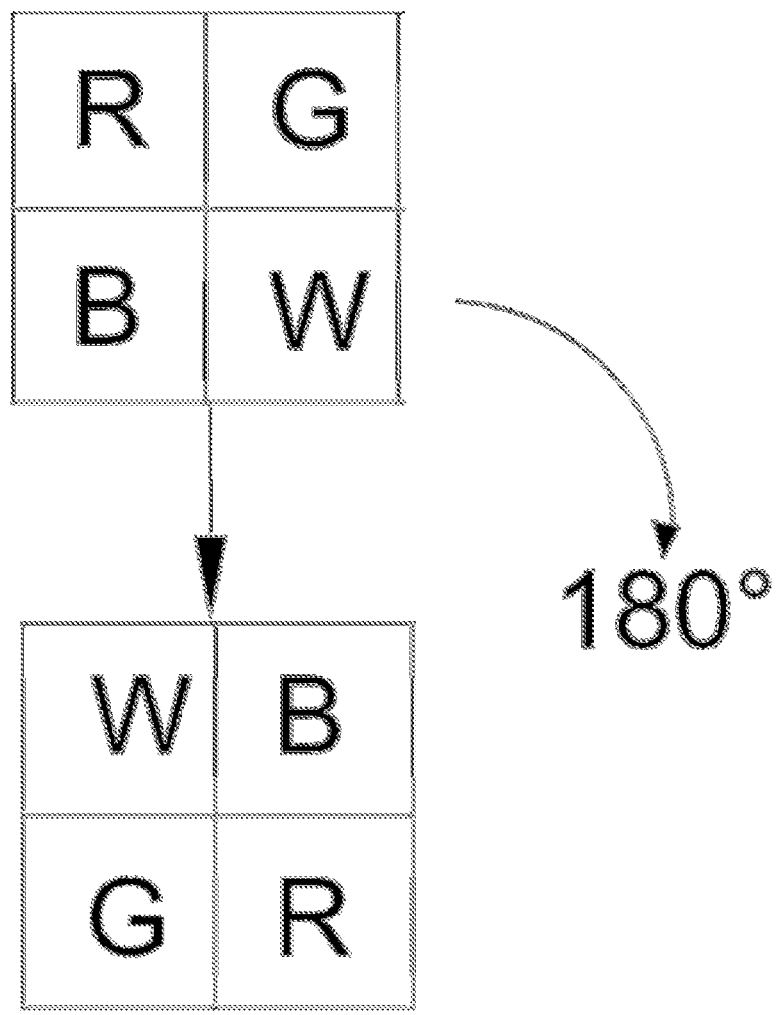
FIG. 7 is a schematic view of an LED array turned by 180°.

As shown in FIG. 7, this embodiment is different from embodiment 1 in that the deflection angle of at least one set light emitting arrays 21 with respect to at least one set of other light emitting arrays 21 is 180°.

Embodiment 3

Figure 8:
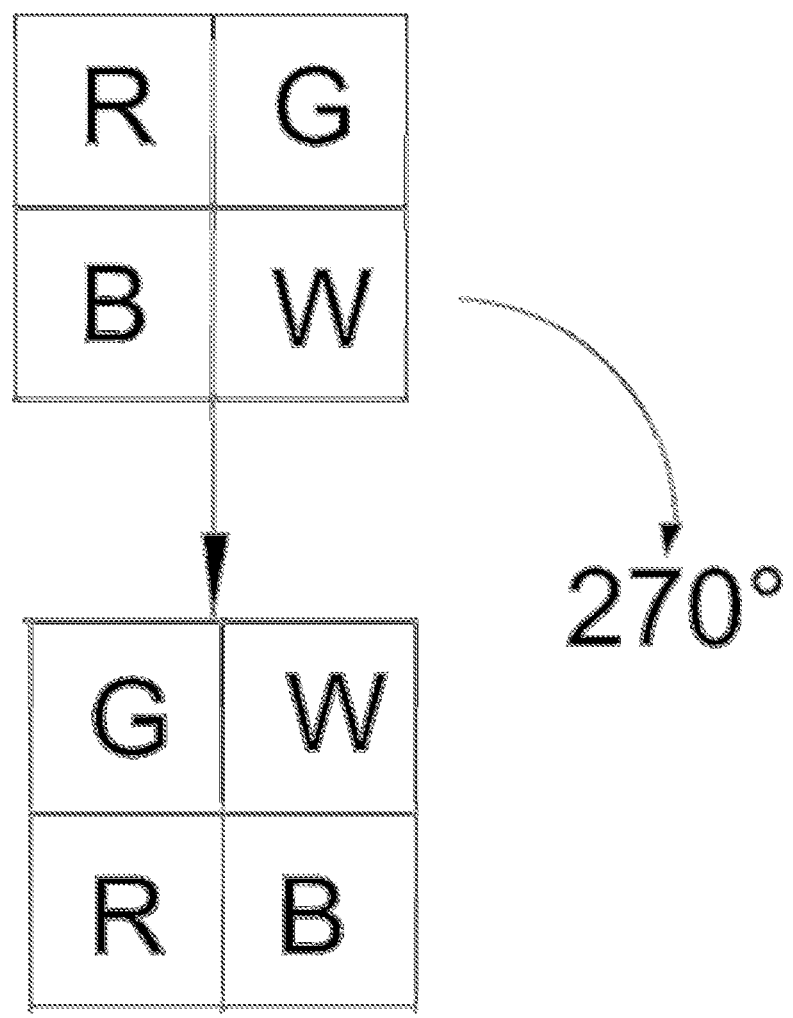
FIG. 8 is a schematic view of an LED array turned by 270°.

As shown in FIG. 8, this embodiment is different from embodiment 1 in that the deflection angle of the at least one set light emitting arrays 21 with respect to at least one set of other light emitting arrays 21 is 270°.

Embodiment 4

Figure 9:
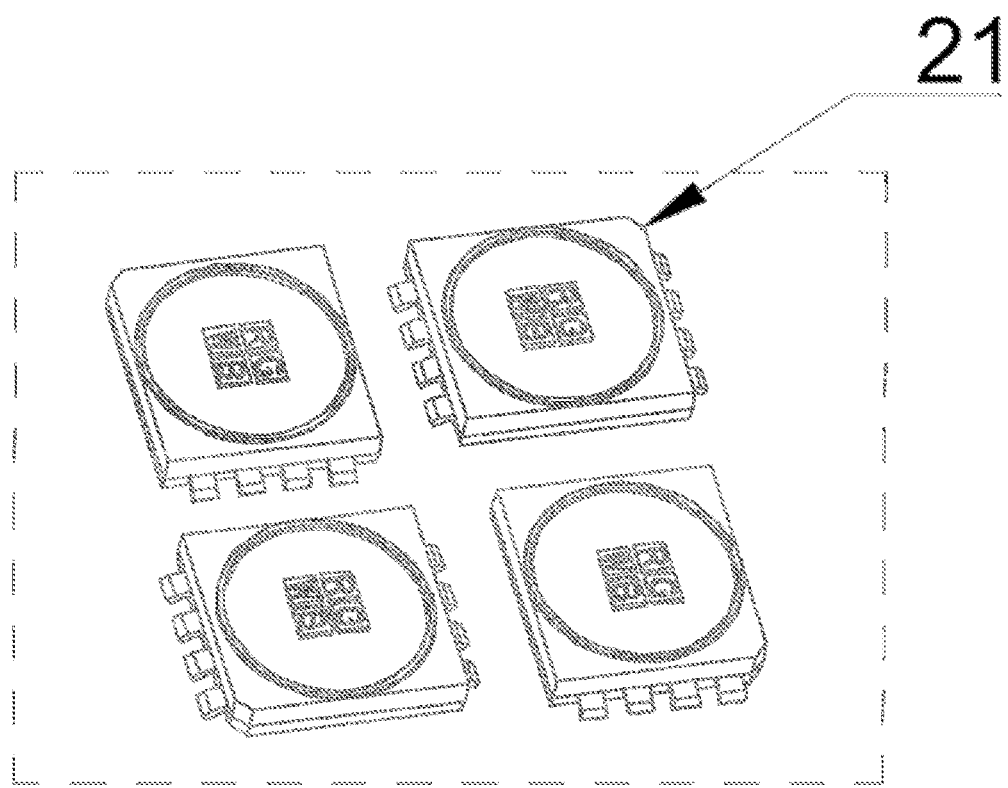
FIG. 9 is a schematic view showing mutual deflection of the light emitting arrays.
Figure 13:
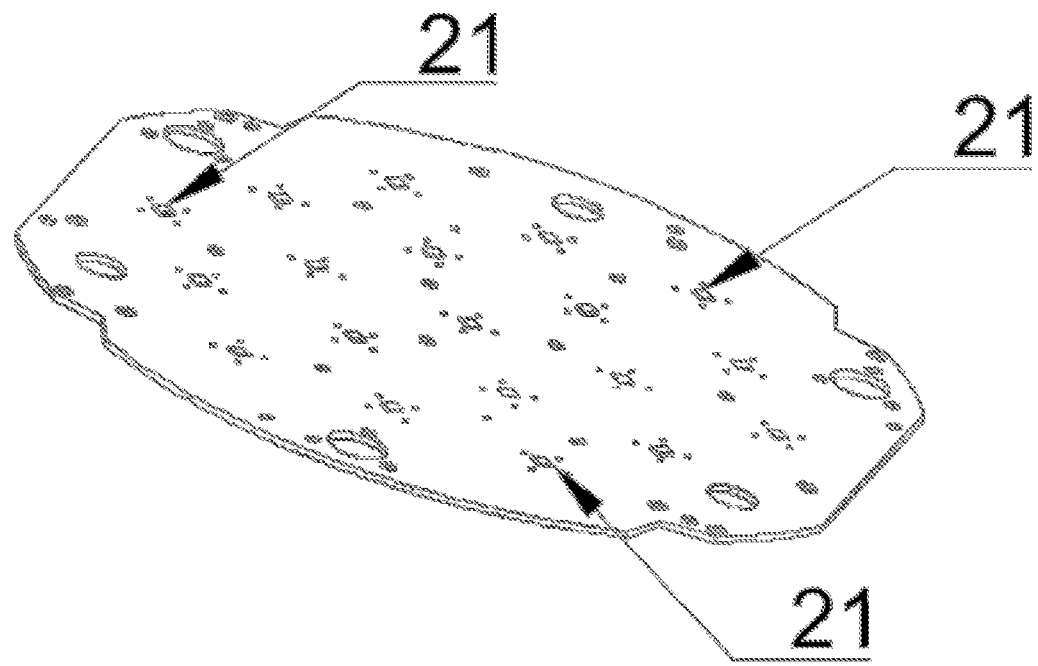
FIG. 13 is another schematic view of a light source disposed on the substrate.

As shown in FIG. 9 and FIG. 13, this embodiment is different from embodiment 1 in that the light emitting array 21 are arranged in the same direction, that is, there is no deflection between the multiple light emitting arrays.

Embodiment 5

This embodiment is different from embodiment 1 in that the optical system further comprises a diffusion structure that is a frosted surface disposed on the output surface of the light pipe or is a diffuser disposed between the output surface of the light pipe and the lens.

Embodiment 6

In another embodiment, an optical system as shown in FIG. 1 and FIG. 2, comprises a substrate 1, a light source 2, a light pipe 3 and an optical lens 4, wherein the light source 2 is mounted on the substrate 1 and includes multiple sets of light emitting arrays 21, corresponding to each set of the light emitting arrays 21, a light pipe 3 is arranged, which includes an input surface 31, at least one light guiding surface 32 and an output surface 33. Light emitted from the light emitting arrays 21 can enter through the input surface 31 of the light pipe 3 and is outputted from the output surface 33 through a light homogenizing treatment by the light guiding surface 32, such light out of the light pipe forming a light beam and being emitted via the optical lens 4. Additionally, the optical system further comprises a honeycomb-like cover 5 that includes multiple through holes 10 sleeved on the lens of the optical lens 4. A cross section of the through hole 10 matches with a maximum cross section of the lens of the optical lens 4, and an overall shape of the through holes 10 being arranged on the honeycomb-like cover 5 matches with an overall shape of the light source 2 being arranged on the substrate 1.

The light source 2 is capable of providing light of different colors or different patterns. With the optical system, light of different colors or different patterns can be sufficiently and uniformly mixed and projected normally with less light loss, thereby maximizing the utilization efficiency of the light source 2. The light source 2 is fixed on the substrate 1 which may be a common fixing plate or a fixing component capable of fixing the light source 2.

The optical lens 4 can have a property of divergence or aggregation for common light beam that can be refracted or diffracted by a focusing optical element. The optical lens 4 includes the lens that is disposed at an end of the output surface 33 of the light pipe 3 such that the light beam is emitted from the lens of the optical lens 4 after passing through the output surface 33 of the light pipe 3.

As shown in FIG. 2, the light pipe 3 includes an input surface 31, at least one light guiding surface 32 and an output surface 33. The input surface 31 is proximal to the light emitting array 21 and is correspondingly provided with an engagement mechanism to couple to the light emitting array 21 to prevent loss of the light beam. The light guiding surface 32 is a main transmission channel for the light beam. The light of the light source 2 enters the light pipe 3 from the input surface 31 and is then outputted from the output surface 33 after undergoing the light homogenizing treatment by the light guiding surface 32, and thus results sufficiently and uniformly mixed light beam through the optical lens 4, which is ultimately projected to a designated area through the optical lens 4.

The optical system of the present invention comprises the light source 2 fixed on the substrate 1 which can be a common fixing plate. Since the light source 2 is coupled to the input surface 31, the light beam emitted from the light source 2 is substantially entirely introduced into the light pipe 3 and a sufficient and uniform mixing of the light beam is achieved with the light pipe 3.

According to this embodiment, the honeycomb-like cover 5 is configured so that the shape of the light spots emitted by the optical system of the present invention is identical with the honeycomb-like cover 5 at certain angles, thus achieving richer effects. Since in a certain angle range, light from one lens may enter another to form vignetting around the light spots, causing light crosstalking. By arranging the honeycomb-like cover 5 with a certain height, light crosstalking can be effectively prevented. The honeycomb-like cover 5 includes multiple through holes 10 and the optical lens 4 includes multiple micro optical lenses 4, each of the micro optical lens 4 corresponding to one of the light pipes 3, thus light of each light beam does not interfere with each other and better light effects are achieved.

As shown in FIG. 1, each of the through holes 10 of the honeycomb-like cover 5 is sleeved with a lens of the optical lens 4, achieving a one-to-one matching. The through hole 10 has a certain cross sectional area and is close to circular, and the size of the cross sections thereof matches with the maximum cross section of the lens of the optical lens 4, thus ensuring that the whole lens of the optical lens 4 can be accommodated in the through hole 10 and effectively preventing light crosstalking.

As shown in FIG. 1, the light source 2 includes the multiple sets of light emitting arrays 21 fixed on the substrate 1 and at least one set light emitting arrays 21 correspond to one light pipe 3. In order to make the distribution of the light source 2 more reasonable and the whole system more compact, the overall shape of the through holes 10 being arranged on the honeycomb-like cover 5 matches with the overall shape of the light source 2 being arranged on the substrate 1, thus forming a one-to-one matching for each component and making the arrangement more compact.

Further, the part of the largest cross section of the lens is attached and fixed to the through hole 10 seamlessly.

To reduce light loss during the light effects treatment for the light beam emitted by the light source 2, the part of the largest cross section of the lenses attached and fixed to the through hole 10 seamlessly. Thus, light leakage and mutual light crosstalking are avoided.

Further, as shown in FIG. 1, FIG. 3 and FIG. 12, the honeycomb-like cover 5 includes an upper honeycomb-like cover 52 and a lower honeycomb-like cover 51, the lower honeycomb-like cover 51 proximal to the light source 2 and having an axial height of $h1 \geq H - L/\tan \alpha$, in which H means vertical distance between the lens of the optical lens and the output surface 33 of the light pipe 3; L means half of the center distance between two light pipes 3; and $\alpha$ means half of the divergence angle of the output surface 33 of the light pipe 3.

The honeycomb-like cover 5 includes the upper honeycomb-like cover 52 proximal to the output surface of the lens of the optical lens and the lower honeycomb-like cover 51 proximal to the light source. Since variation of both the light emitting arrays and shape of the output surface of the light pipe 3 affect the divergence angle of the light beam, and different divergence angles of the light beams may cause different effects of light crosstalk, the shape of the lower honeycomb-like cover 51 is set based on the divergence angle of the output surface of the light pipe 3 according to the present invention, so that light cross-talking is effectively avoided.

The divergence angle of the light beam is used to measure the speed at which the light beam diverges outward from the beam waist. A light beam with a very small divergence angle, the radius of the light beam near to a constant over a long transmission distance, for example, is called a collimated beam. Since the larger the divergence angle of the light beam is, the higher the possibility of mutual influence between the light beams is and the greater the chance of light crosstalking is, the divergence angle of the output surface of the light pipe 3 is measured to work out the axial height of the lower honeycomb-like cover 51 thereby preventing light crosstalking more effectively and accurately. Accordingly, for the above-mentioned formula of the present invention, in a case where other variables are determined, the larger the divergence angle $2\alpha$ of the output surface of the light pipe 3 is, the smaller the $L/\tan \alpha$ is and thus the higher the axial height h1 of the lower honeycomb-like cover 51 needs to be set; and conversely the smaller the divergence angle $2\alpha$ of the output surface of the light pipe 3 is, the larger the $L/\tan \alpha$ is and the lower the axial height h1 of the lower honeycomb-like cover 51 needs to be set. According to the present invention, by flexibly setting the axial height of the lower honeycomb-like cover 51, light crosstalking can be effectively avoided and the axial height of the lower honeycomb-like cover 51 can be minimized. Therefore, the volume of the entire optical system can also be reduced with light crosstalking avoided.

In another aspect, since the smaller the center distance between two light pipes 3 is, the greater the possibility of mutual influence between the light beams is and the greater the possibility of causing light crosstalking is, accordingly, the axial height of the lower honeycomb-like cover 51 can be set relatively high; and conversely the larger the center distance between two light pipes 3 is, the smaller the possibility of mutual influence between the light beams is and the smaller the possibility of causing light crosstalking is, so that the axial height of the lower honeycomb-like cover 51 can be set relatively low. Accordingly, for the above-mentioned formula of the present invention, in a case where other variables are determined, the larger the center distance L between two adjacent light pipes 3 is, the greater the L/tan α is and therefore the lower the axial height h1 of the lower honeycomb-like cover 51 needs to be set; and conversely the smaller the center distance 2L between the two adjacent light pipes 3 is, the smaller the L/tan α is and the higher the axial height h1 of the lower honeycomb-like cover 51 needs to be set.

Therefore, the center distance between the light pipes 3 is inversely proportional to the axial height h1 of the lower honeycomb-like cover 51, while the divergence angle 2α of the output surface 33 of the light pipe 3 is proportional to the axial height h1 of the lower honeycomb-like cover 51. Thus, the formula in the present invention can help to prevent light crosstalking and minimize the volume of the light emitting system.

Further, the axial height of the upper honeycomb-like cover 52 is 45 mm.

Figure 10:
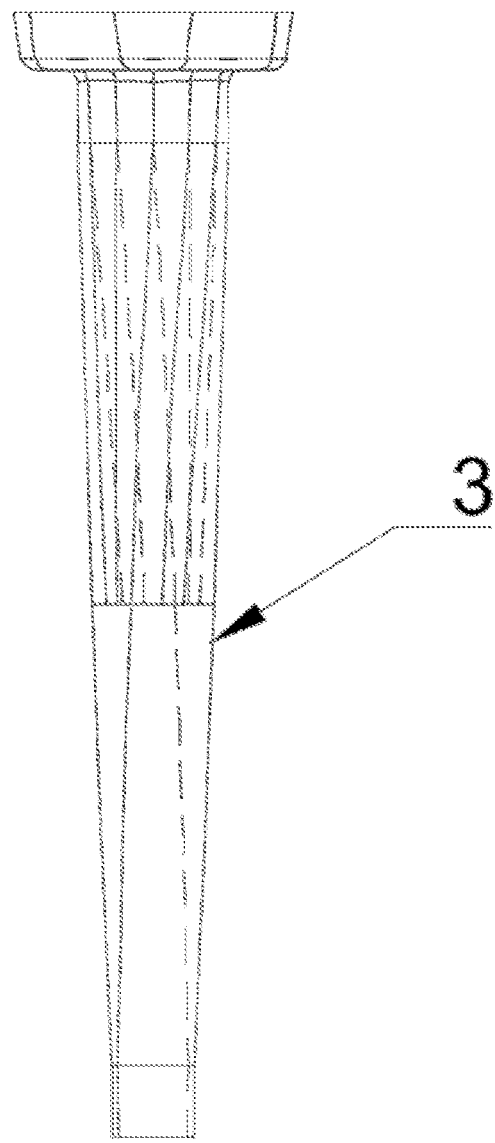
FIG. 10 is a schematic view of a twisted light pipe.

Further, as shown in FIG. 10, at least a portion of the light guiding surface 32 of the light pipe 3 is provided with a twist structure, such that a plurality of light beams emitted from the light source 2 can generate uniform patterns after the light beams are treated by the light pipe 3 with the twist structure.

Since the light guiding surface 32 is the main transmission channel for the light beams, the light mixing effect can be directly improved by improving the light guiding surface 32. According to the present embodiment, at least a portion of the light guiding surface 32 of the light pipe 3 is provided with the twist structure. The twist structure can be an irregular twist structure of the light guiding surface 32 or a certain regular twist structure of the light guiding surface 32. When the light guiding surface is twisted, it must be ensured that the emitting axis of the light source 2 is not affected to further prevent loss of light. Accordingly, with treatment by the light guiding surface 32, the light beams from the light source 2 will collide with each other and be deflected on the light guiding surface 32, to achieve a uniform mixing. And ultimately a plurality of light beams emitted is deflected at a certain angle, produces uniform patterns and is uniform in color.

As shown in FIG. 10, when the light pipe 3 is the twist structure, or at least a portion of the light guiding surface 32 is provided with the twist structure, the twist structure is an axial twist structure where the light guiding surface 32 is at a certain angle with respect to a light axis.

The twist structure of the light pipe 3 may be an overall axial twist structure, or only portion of the light guiding surface 32 of the light pipe 3 is the axial twist structure. The light axis is an axis of the light emitting array 21 from the input end to the output end, or an axis parallel thereto, and the light axis is also called output axis of the light source 2. Surface of the light guiding surface 32 can present the twist structure or the entire light pipe 3 can be the twist structure, such that the light guiding surface 32 of the light pipe 3 is relatively at a certain angle with respect to the light axis. The angle can be set according to the light beam mixing effect. The axial twist mode can also vary and different areas of the light pipe 3 can be designed in the same axial twist mode or different axial twist modes.

The twist structure of the present invention is designed to be the axial twist structure such that the light from the light source 2 is deflected to a certain degree after passing the light guiding surface 32, thus achieving a uniform mixing of the out-of-order light beams of different wavelengths. Moreover, the output direction of the light from the light source 2 would not be affected by the axial twist structure and light loss of the light source 2 can be avoided.

Further, the input surface 31 of the light pipe 3 is rectangular and the output surface 33 of the light pipe 3 is regular decagonal.

Different from the input surface 31, the output surface 33 works to make the light beams deflected when passing the guiding surface 32 to be emitted intensively after passing through the output surface 33 and make the emitted light beams more uniform. The shape of the output surface 33 of the present invention is regular decagonal such that the light source 2 has multiple symmetric centers to allow easy formation of uniform light spots and that different light effects can be produced to meet needs in different occasions.

Figure 11:
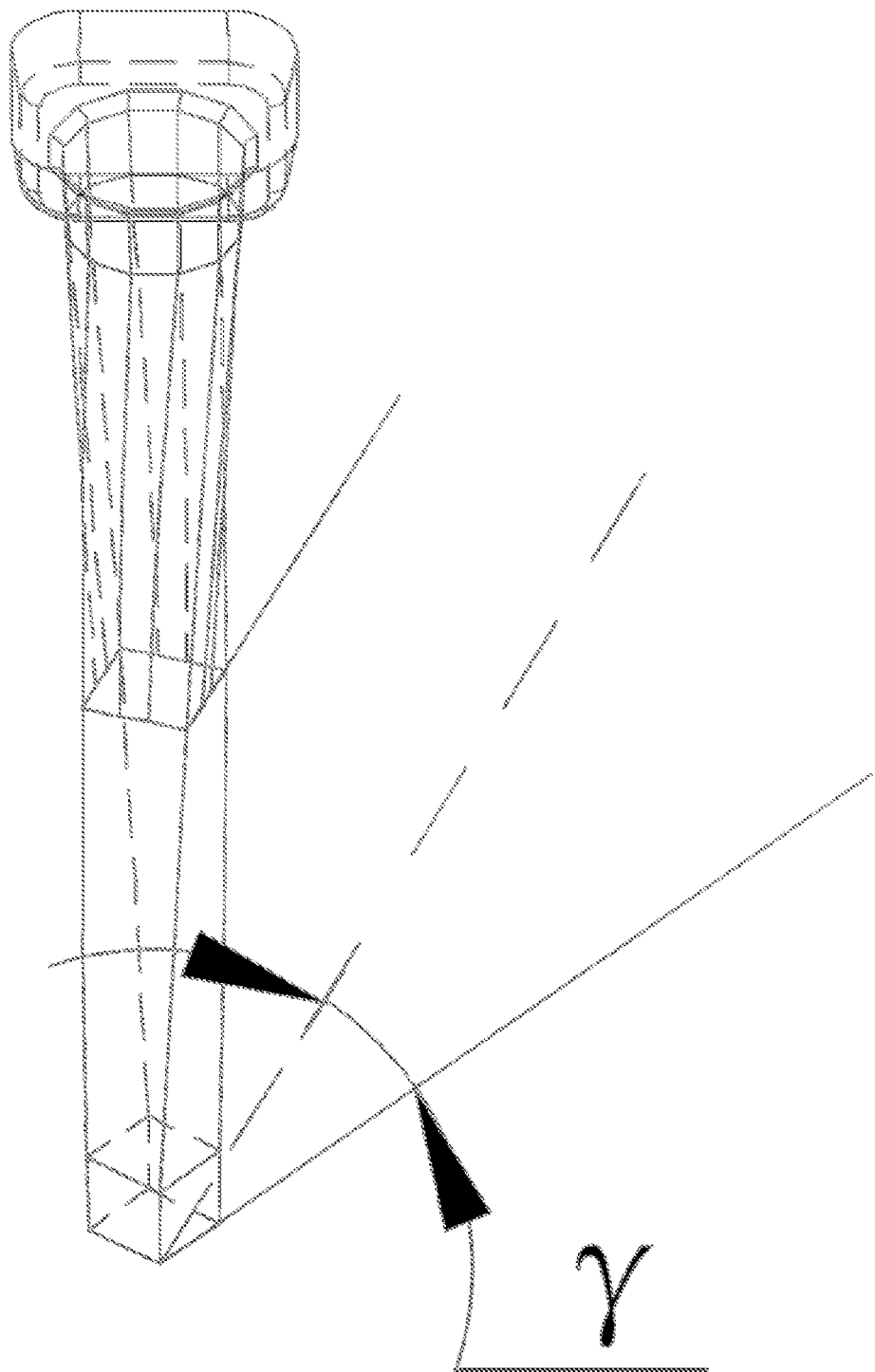
FIG. 11 is another schematic view of the twisted light pipe.

Further, as shown in FIG. 10 and FIG. 11, after the light pipe 3 is twisted, the output surface 33 of the light pipe will deflect at an angle γ with respect to the input surface 31, and γ is preferably 45°.

The twist structure of the light pipe 3 can make the light beams mixed more uniformly to form uniform light spots ultimately. In order to avoid possible loss of the light energy due to an overly large deflection angle after the light pipe 3 is twisted, the deflection angle of the output surface 33 of the light pipe 3 with respect to the input surface 31 is preferably 45°.

Besides the deflection angle of 45° in the present embodiment, 10°, 30°, 50°, 60°, 70° or 80° can also be adopted in other embodiments, and the same technical effects of uniform light mixing can also be achieved.

Further, the axial twist structure is a spiral twist structure.

The spiral twist structure is a texture rotating spirally and arranged on the light guiding surface 32 of the light pipe 3, or is an overall twist of the light pipe 3, which can increase collisions and bettering mixing of light from the light source 2.

Further, the axial twist structure is a rib-typed twist structure.

The rib-typed twist structure is a twist structure with rib texture disposed on the light guiding surface 32 where the rib protrudes form the light guiding surface 32 by a certain height. After light from the light source 2 enters the light pipe 3, a portion of the light beams of different colors or patterns will be emitted on the protruded rib, resulting in collision of light beams from the same light source 2 on the light guiding surface, and the twist direction of the rib is centered on the light axis, so that the light beams will finally be guided to exit the light pipe 3 after being mixed uniformly by mutual collision of the light beams, with an extremely small portion of loss or zero loss of the light energy.

Further, a deflection angle δ of the rib with respect to the light axis ranges from 0° to 90°.

The deflection angle of the rib and the light axis directly decides the distribution density of the rib on the light guiding surface 32. The distribution density of the rib affects the number of deflection of the light beams and the direction of the deflection. Accordingly, an overly large distribution density or an overly small distribution density will directly affect light emission efficiency and the light mixing effect. Therefore, the deflection angle is set to be from 0° to 90° according to the present invention, to achieve a sufficient and uniform mixing of the light from light source 2 under the premise of ensuring the light emission efficiency.

Further, the height of the twist structure is approximately half of total length of the light guiding surface 32.

The height of the twist structure refers to the height of the twist portion on the light guiding surface 32 and also represents the area of the rib covering the light guiding surface 32. The higher the height is, the better the light mixing effect will be. But since the light beams can be sufficiently mixed with a set height, a higher height than the set height will increase the production cost, the height of the twist structure is set to be approximately half of the total length according to the present invention.

Further, the light emitting arrays 21 are LED chip arrays.

The LED chip can emit light with four different wavelengths and arrangement thereof forms a "square" shape. The LED chips G, R, B, and W of the LED chip array are green LED chip, red LED chip, blue LED chip and white LED chip, emitting green light, red light, blue light and while light respectively. To further improve the quality of the white light generated by the packed LED chips, four LED chips including a red LED chip (R), a green LED chip (G), a blue LED chip (B) and a white LED chip (W) are used. In addition, with the advancement of technology, LED chips of other colors can also achieve a uniform mixing of light. With the advancement of LED chip design, LED chips of a different number and/or a different color can also be used in the LED chip array to upgrade mixing of the light beams or to achieve different mixing effects of the light beams.

Accordingly, in the present embodiment, the light guiding surface 32 of the light pipe 3 is twisted itself such that the light beams of different wavelengths from the LED can be respectfully deflected to different degrees after entering the light pipe 3 to ultimately achieve a uniform mixing of the light beams.

Further, the output surface 33 of the light pipe 3 is circular-like.

Different from the input surface 31, the output surface 33 works to make the light beams deflected when passing the light guiding surface 32 to be emitted intensively after passing through the output surface 33 and make the emitted light beams more uniform. In some embodiments of the present invention, the output surface 33 is substantially circular or is directly set to be circular, making the emitted light beams more uniform.

Further, the cross sectional area of the light pipe 3 increases gradually from the input surface 31 to the output surface 33.

Since the cross sectional area of the light pipe 3 increases with the distance from the input surface of the light increasing, the light pipe 3 can be designed in segment or in integration. When designed in segment, each cross section of each segment can hold different shapes and/or cross sectional area; and when designed in integration, the light pipe 3 can generally change from large to small, to achieve concentration of light.

Embodiment 7

This embodiment is different from embodiment 6 in that the optical system further comprises a diffusion structure that is a frosted surface disposed on the output surface 33 of the light pipe 3 or is a diffuser disposed between the output surface 33 of the light pipe 3 and the lens.

Embodiment 8

This embodiment is different from embodiment 6 in that multiple light pipes 3 are rotated at a certain angle with respect to one or more other light pipes 3.

In such arrangement, the light 3 itself not only has the twist structure, but the light pipe 3 can be rotated by a certain angle to make the light beams better deflected, thereby achieving a more sufficient light mixing.

Embodiment 9

This embodiment is different from embodiment 6 in that the axial twist structure is a textured twist structure.

The textured twist structure is a twist structure with various twist forms arranged on the light guiding surface 32, such as a lateral twist structure or a vertical twist structure, all falling within the scope of protection of the present invention. By arranging the texture, a portion of the light beams can be deflected when passing the light guiding surface 32, thereby achieving a uniform mixing of the light beams.

The textured twist structure and the twist structure of the light guiding surface 32 can be implemented in different embodiments separately or can be implemented in one embodiment. Each can achieve a uniform mixing of the light.

Further, the textured twist structure is that the light guiding surface 32 has twist texture in a direction from the input end to the output end of the light source 2.

The twist texture structure can be a spiral twist texture structure, i.e. the light guiding surface 32 has spirally rising texture in the direction from the input end to the output end of the light source 2. The texture is different from the rib in that the texture is mainly distributed on the surface of the light guiding surface 32. Generally, the texture of the surface of an object is uneven grooves presented on the surface of the object. Actually, it can also make texture or patterns on the surface of the light guiding surface 32, which will produce a sense of unevenness tactilely. Uneven patterns can be regular or irregular.

Furthermore, the rib can be integrally formed with the surface of the light pipe 3 or can be protrusions additionally attached to the surface of the light pipe 3. The protrusions of the rib are more obvious compared with the unevenness of the texture, which can also play an effective role in deflecting the light beams.

Embodiment 10

This embodiment is different from embodiment 6 in that the light emitting array 21 deflects at a certain angle with respect to at least one set of other light emitting arrays 21, such that after light of the light source 2 is treated by the light pipe 3, a plurality of light beams emitted will offset and generate uniform light spots.

To achieve a better light homogenizing effect, the light emitting array 21 deflects at a certain angle with respect to at least one set of other light emitting arrays 21. The light source 2 of the present invention includes multiple sets of the light emitting arrays 21, each of which is relatively angled to allow the production of different light confluence effects. According to the present invention, the light of the light source 2 is deflected right from the source, such that light of different colors or patterns can have a better mixing after confluence and the light beams can ultimately be emitted as uniform light beams.

The deflection means that there is a certain deflection angle between two or more sets of the light emitting arrays 21. The light emitting array 21 can emit light of multiple wavelengths or of various shapes. Such deflection angle between the light emitting arrays 21 can achieve that the light beams will be sufficiently and uniformly mixed without changing the shape or structure of the light pipe 3.

Further, as shown in FIG. 4 and FIG. 5, the deflection angle of the light emitting array 21 with respect to at least one set of other light emitting arrays 21 is 90°.

The deflection of the light emitting array 21 allows the light beam to be emitted on the light guiding surface 32 after the light being deflected, and then the light beam can be further deflected in the light guiding surface 32, thus achieving a uniform mixing of the light beam. The deflection angle of the light emitting array 21 can be arbitrary which can form various deflection arrangements, making richer effects for the overall light spots.

Embodiment 11

In another embodiment, an optical system as shown in FIG. 1 and FIG. 2 comprises: a substrate 1, a light source 2, a light pipe 3 and an optical lens 4, wherein the light source 2 is mounted on the substrate 1 and includes multiple sets of light emitting arrays 21, corresponding to each set of the light emitting arrays 21, a light pipe 3 is arranged, which includes an input surface 31, at least one light guiding surface 32 and an output surface 33. Light emitted from the light emitting arrays 21 enter through the input surface 31 of the light pipe 3 and is outputted from the output surface 33 through a light homogenizing treatment by the light guiding surface 32, such light out of the light pipe forming a light beam by passing and being emitted via the optical lens 4. Additionally, the optical system further comprises a honeycomb-like cover 5 that includes multiple through holes 10 sleeved on the lens of the optical lens 4. A cross section of the through hole 10 matches with a maximum cross section of the lens of the optical lens 4, and an overall shape of the through holes 10 being arranged on the honeycomb-like cover 5 matches with an overall shape of the light source 2 being arranged on the substrate 1.

The light source 2 is capable of providing light of different colors or different patterns. With the optical system, light of different colors or different patterns can be sufficiently and uniformly mixed and projected normally with less light loss, thereby maximizing the utilization efficiency of the light source 2. The light source 2 is fixed on the substrate 1 which may be a common fixing plate or a fixing component capable of fixing the light source 2.

The optical lens 4 is an optical element made of transparent material, whose surface is a part of a sphere. It can be lens or a relevant optical lens system including a concave lens, a convex lens, an objective lens, a zoom lens 4 or other optical elements. The optical elements are adapted to affect a common light beam and ultimately cause the light to be outputted onto a projection screen or object for imaging. The optical lens or the optical lens system may have a property of divergence or aggregation for the common light beam that can be refracted or diffracted by a focusing optical element. The optical lens 4 includes the lens that is disposed at an end of the output surface 33 of the light pipe 3 such that the light beam is emitted from the lens of the optical lens 4 after passing through the output surface 33 of the light pipe 3.

The light pipe 3 may be configured in various shapes, including an input surface 31, at least one light guiding surface 32 and an output surface 33. The input surface 31 is proximal to the light emitting array 21 and is correspondingly provided with an engagement mechanism to couple to the light emitting array 21 to prevent loss of the light beam. The light guiding surface 32 is a main transmission channel for the light beam. The light beam of the light source 2 enters the light pipe 3 from the input surface 31 and is then outputted from the output surface 33 after undergoing the light homogenizing treatment by the light guiding surface 32, and thus results a sufficiently and uniformly mixed light beam through the optical lens 4, which is ultimately projected to a designated area through the optical lens 4.

The optical system of the present invention comprises the light source 2 fixed on the substrate 1 which can be a common fixing plate. Since the light source 2 is coupled to the input surface 31, the light beam emitted from the light source 2 is substantially entirely introduced into the light pipe 3 and a sufficient and uniform mixing of the light beam is achieved with the light pipe 3.

According to this embodiment, the honeycomb-like cover 5 is configured so that the shape of the light spots emitted by the optical system of the present invention is identical with the honeycomb-like cover 5 at certain angles, thus achieving richer effects. Since in a certain angle range, light from one lens may enter another to form vignetting around the light spots, which may cause light crosstalking. While such light crosstalking can be effectively prevented in this embodiment by arranging the honeycomb-like cover 5 with a certain height. In addition, the honeycomb-like cover 5 includes multiple through holes 10 and the optical lens 4 includes multiple micro optical lenses 4, each of the micro optical lens 4 correspondingly provided with one light pipe 3, so that light of each light beam will not interfere with each other, thus achieving better light effects.

Each of the through holes 10 of the honeycomb-like cover 5 is sleeved with a lens of the optical lens 4, achieving a one-to-one matching. The through hole 10 has a certain cross sectional area and is close to circular, and the size of the cross sections thereof matches with the maximum cross section of the lens of the optical lens 4, thus ensuring that the whole lens of the optical lens 4 can be accommodated in the through hole 10 and effectively preventing light crosstalking.

The light source 2 includes the multiple sets of light emitting arrays 21 fixed on the substrate 1 and at least one set light emitting arrays 21 correspond to one light pipe 3. To make the distribution of the light source 2 more reasonable and the pattern of the whole system more compact, the overall shape of the through holes 10 being arranged on the honeycomb-like cover 5 matches with the overall shape of the light source 2 being arranged on the substrate, thus forming a one-to-one matching for each component and making the arrangement more compact.

Further, the part of the largest cross section of the lens is attached and fixed to the through hole 10 seamlessly.

To reduce light loss during the light effects treatment for the light beam emitted by the light source 2, the part of the largest cross section of the lens is attached and fixed to the through hole 10 seamlessly. Thus, light leakage and mutual light crosstalking are avoided.

Further, as shown in FIG. 1, FIG. 3 and FIG. 12, the honeycomb-like cover 5 includes an upper honeycomb-like cover 52 and a lower honeycomb-like cover 51, the lower honeycomb-like cover 51 proximal to the light source 2 and having an axial height of $h1 \geq H - L/\tan \alpha$, in which H means vertical distance between the lens of the optical lens and the output surface 33 of the light pipe 3; L means half of the center distance between the intermediate points of two light pipes 3; and $\alpha$ means half of the divergence angle of the output surface 33 of the light pipe 3.

The honeycomb-like cover 5 includes the upper honeycomb-like cover 52 proximal to the output surface of the lens of the optical lens and the lower honeycomb-like cover 51 proximal to the light source. Since variation of both the light emitting arrays and shape of the output surface of the light pipe 3 affect the divergence angle of the light beam, and different divergence angles of the light beams may cause different light crosstalking effects, the shape of the lower honeycomb-like cover 51 is set based on the divergence angle of the output surface of the light pipe 3 according to the present invention, so that light cross-talking is effectively avoided.

The divergence angle of the light beam is used to measure the speed at which the light beam diverges outward from the beam waist. A light beam with a very small divergence angle, the radius of the light beam near to a constant over a long transmission distance, for example, is called a collimated beam. Since the larger the divergence angle of the light beam is, the higher the possibility of mutual influence between the light beams is and the greater the chance of light crosstalking is, the divergence angle of the output surface of the light pipe 3 is measured to work out the axial height of the lower honeycomb-like cover 51 thereby preventing light crosstalking more effectively and accurately. Accordingly, for the above-mentioned formula of the present invention, in a case where other variables are determined, the larger the divergence angle $2\alpha$ of the output surface of the light pipe 3 is, the smaller the L/tan $\alpha$ is and thus the higher the axial height h1 of the lower honeycomb-like cover 51 needs to be set; and conversely the smaller the divergence angle $2\alpha$ of the output surface of the light pipe 3 is, the larger the L/tan $\alpha$ is and the lower the axial height h1 of the lower honeycomb-like cover 51 needs to be set. According to the present invention, by flexibly setting the axial height of the lower honeycomb-like cover 51, light crosstalking can be effectively avoided and the axial height of the lower honeycomb-like cover 51 can be minimized. Therefore, the volume of the entire optical system can also be reduced with light crosstalking avoided.

In another aspect, since the smaller the center distance between two light pipes 3 is, the greater the possibility of mutual influence between the light beams is and the greater the possibility of causing light crosstalking is, accordingly the axial height of the lower honeycomb-like cover 51 can be set relatively high; and conversely the larger the center distance between two light pipes 3 is, the smaller the possibility of mutual influence between the light beams is and the smaller the possibility of causing light crosstalking is, so that the axial height of the lower honeycomb-like cover 51 can be set relatively low. Accordingly, for the above-mentioned formula of the present invention, in a case where other variables are determined, the larger the center distance L between two adjacent light pipes 3 is, the greater the L/tan $\alpha$ is and therefore the lower the axial height h1 of the lower honeycomb-like cover 51 needs to be set; and conversely the smaller the center distance 2L between the two adjacent light pipes 3 is, the smaller the L/tan $\alpha$ is and the higher the axial height h1 of the lower honeycomb-like cover 51 needs to be set.

Therefore, the center distance between the light pipes 3 is inversely proportional to the axial height h1 of the lower honeycomb-like cover 51, while the divergence angle $2\alpha$ of the output surface 33 of the light pipe 3 is proportional to the axial height h1 of the lower honeycomb-like cover 51. Thus, the formula in the present invention can help to prevent light crosstalking and minimize the volume of the light emitting system.

Further, the axial height of the upper honeycomb-like cover 52 is 25 mm.

Further, as shown in FIG. 5, one light emitting array 21 is configured to deflect at a certain angle with respect to at least one set of other light emitting arrays 21, such that after light of the light source 2 is treated by the light pipe 3, a plurality of light beams emitted will offset at a certain angle and generate uniform light spots.

To achieve a better light homogenizing effect, one light emitting array 21 is configured to deflect at a certain angle with respect to at least one set of other light emitting arrays 21. The light source 2 of the present invention includes multiple sets of the light emitting arrays 21, each of which is relatively angled to allow different light confluence effects. According to the present invention, the light of the light source 2 is deflected right from the source, such that light of different colors or patterns can have a better mixing after confluence and the light beams can ultimately be emitted as uniform light beams.

The deflection means that there is a certain deflection angle between two or more sets of the light emitting arrays 21. The light emitting array 21 can emit light of multiple wavelengths or of various shapes. The light emitting arrays 21 configured to deflect at a certain angle allow the light beams to be mixed sufficiently and uniformly without changing the shape or structure of the light pipe 3.

Further, as shown in FIG. 10 and FIG. 11, at least a portion of the light guiding surface 32 of the light pipe 3 is provided with a twist structure, such that a plurality of light beams emitted from the light source 2 can generate uniform patterns after the light beams are treated at the light pipe 3 with the twist structure.

Since the light guiding surface 32 is the main transmission channel for the light beams, the light mixing effect can be directly improved by improving the light guiding surface 32. According to the present embodiment, at least a portion of the light guiding surface 32 of the light pipe 3 is provided with the twist structure. The twist structure can be an irregular twist structure of the light guiding surface 32 or a certain regular twist structure of the light guiding surface 32. When the light guiding surface is twisted, it must be ensured that the emitting axis of the light source 2 is not affected to further prevent loss of light. Accordingly, with treatment by the light guiding surface 32, the light beams from the light source 2 will collide with each other and be deflected on the light guiding surface 32, to achieve a uniform mixing. And ultimately a plurality of light beams emitted has deflection at a certain angle, produces uniform patterns and is uniform in color.

When the light pipe 3 is the twist structure, or at least a portion of the light guiding surface 32 is provided with the twist structure, the twist structure is an axial twist structure where the light guiding surface 32 is at a certain angle with respect to a light axis.

The twist structure of the light pipe 3 may be an overall axial twist structure, or only portion of the light guiding surface 32 of the light pipe 3 is the axial twist structure. The light axis is an axis of the light emitting array 21 from the input end to the output end, or an axis parallel thereto, and the light axis is also called output axis of the light source 2. Surface of the light guiding surface 32 can present the twist structure or the entire light pipe 3 can be the twist structure, such that the light guiding surface 32 of the light pipe 3 is relatively at a certain angle with respect to the light axis. The angle can be set according to the light beam mixing effect. The axial twist mode can also vary and different areas of the light pipe 3 can be designed in the same axial twist mode or different axial twist modes.

The twist structure of the present invention is designed to be the axial twist structure such that the light from the light source 2 is deflected to a certain degree after passing the light guiding surface 32, thus achieving a uniform mixing of the out-of-order light beams of different wavelengths. Moreover, the output direction of the light from the light source 2 would not be affected by the axial twist structure and light loss of the light source 2 can be avoided.

For the above design, the light emitting array 21 deflects at a certain angle with respect to at least one set of other light emitting arrays 21 when at least a portion of the light guiding surface 32 of the light pipe 3 is provided with the twist structure. The twist structure of the light guiding surface 32 can be a spiral twist structure and/or with texture, or a spiral twist structure and/or with ribs. Therefore, the two design modes of relative deflection of the light emitting arrays 21 and twist of the light guiding surface 32 can be combined to achieve a sufficient mixing of the light source 2 and the combination is flexible. Any of the two modes can realize the mixing of the light source 2 and would not cause loss of the light source 2.

Further, the input surface 31 of the light pipe 3 can be in any shape. The output surface 33 of the light pipe 3 is a circular or regular dodecagonal shape.

Different from the input surface 31, the output surface 33 works to make the light beams deflected when passing the guiding surface 32 to be emitted intensively after passing through the output surface 33 and make the emitted light beams more uniform. The shape of the output surface 33 of the present invention is close to circular or is directly set to be circular, making the emitted light beams more uniform. Further, the output surface can be set to be a regular polygon according to the needs of the user such that the light source 2 has multiple symmetrical centers to allow easy formation of uniform light spots and different light effects can be produced to meet needs in different occasions.

Further, the input surface 31 of the light pipe 3 is square.

The input surface 31 of the light pipe 3 in the present invention has a square cross section such that the light beams can be deflected in the light pipe 3 to present better light mixing effect.

Further, the deflection angle β of the light emitting array 21 with respect to at least one set of other light emitting arrays 21 is 90°.

The deflection of the light emitting array 21 allows the light beam to enter the light guiding surface 32 after being deflected, and then the light beam can be further deflected in the light guiding surface 32, thus achieving a uniform mixing of the light beam. The light emitting array 21 has an arbitrary deflection angle and can form various deflection arrangements, making richer effects for the overall light spots.

Further, as shown in FIG. 11, as the light pipe 3 is twisted, the output surface 33 of the light pipe 3 will be deflected with respect to the input surface 31, and the defection angle γ is 80°.

The twist structure of the light pipe 3 can make the light beams mixed more uniformly to form uniform light spots ultimately. In order to avoid possible loss of the light energy due to an overly large deflection angle after the light pipe 3 is twisted, the deflection angle of the output surface 33 of the light pipe 3 with respect to the input surface 31 is preferably 80°.

Further, the axial twist structure is a spiral twist structure.

The spiral twist structure is a structure with texture rotating spirally and arranged on the light guiding surface 32 of the light pipe 3, or is an overall twist structure of the light pipe 3, which can increase collisions and bettering mixing of light from the light source 2.

Further, the axial twist structure is a rib-typed twist structure.

The rib-typed twist structure is a twist structure with rib texture disposed on the light guiding surface 32 where the rib protrudes form the light guiding surface 32 by a certain height. After light from the light source 2 enters the light pipe 3, a portion of the light beams of different colors or patterns will be emitted on the protruded rib, resulting in collision of light beams from the same light source 2 on the light guiding surface, and the twist direction of the rib is centered on the light axis, so that the light beams will finally be guided to exit the light pipe 3 after being mixed uniformly by mutual collision of the light beams, with an extremely small portion of loss or zero loss of the light energy.

Further, the rib-typed twist structure is the spiral twist structure from the input end to the output end of the light source 2.

On one hand, in order to make the light beams undergo total reflection multiple times in the light guiding surface 32 to be sufficiently mixed, the rib-typed twist structure is arranged on the light guiding surface 32 according to the present invention. The rib-typed twist structure can partially or totally cover the light guiding surface 32. On the other hand, in order to minimize loss of the light beam in the light guiding surface 32 due to deflection, the spiral twist structure used in the present invention can guide the light beam to exit in the output direction of the light source 2 along the light axis.

Further, a deflection angle δ of the rib with respect to the light axis ranges from 0° to 90°.

The deflection angle of the rib and the light axis directly decides the distribution density of the rib on the light guiding surface 32. The distribution density of the rib affects the number of deflection of the light beams and the direction of the deflection. Accordingly, an overly large distribution density or an overly small distribution density will directly affect light emission efficiency and the light mixing effect. Therefore, the deflection angle is set to be from 0° to 90° according to the present invention, to achieve a sufficient and uniform mixing of the light from light source 2 under the premise of ensuring the light emission efficiency.

Further, the height of the twist structure is about two thirds of the total length of the light guiding surface 32.

The height of the twist structure refers to the height of the twist portion on the light guiding surface 32 and also represents the area of the rib covering the light guiding surface 32. The higher the height is, the better the light mixing effect will be. But since the light beams can be sufficiently mixed with a set height, a higher height than the set height will increase the production cost, the height of the twist structure is set to be about two thirds of the total length according to the present invention.

Further, an overall shape of the multiple light emitting arrays 21 arranged on the substrate is a regular octagon, and the overall shape of the through holes 10 arranged on the honeycomb-like cover 5 is a regular octagon.

The multiple light emitting array 21 are arranged in form of various geometric figures, which can enhance light confluence. And such arrangement of the light emitting array 21 allows the light beams to affect each other to cause more deflection, thereby achieving better light mixing effect.

The multiple light emitting arrays 21 can be arranged in form of various geometric figures. In the present embodiment, when at least a portion of the light guiding surface 32 of the light pipe 3 is provided with the twist structure, the deflection angles of the multiple light emitting arrays 21 with respect to the light axis are the same, and the multiple light emitting arrays 21 will be arranged in form of various geometric figures. The light beams are finally mixed together after being deflected inside the light pipe 3, thus achieving a uniform mixing effect for light of the light source 2.

Further, the twist structure of the light pipe 3 includes that multiple light pipes 3 are rotated at a certain angle with respect to one or more other light pipes 3.

In the present embodiment, the light pipe 3 itself not only has the twist structure, but the light pipe 3 can be rotated by a certain angle, so that the light beams can be better deflected, thereby achieving a more sufficient light mixing.

Further, the light emitting arrays 21 are LED chip arrays.

The LED chip can emit light with four different wavelengths and arrangement thereof forms a "square" shape. The LED chips G, R, B, and W of the LED chip array are green LED chip, red LED chip, blue LED chip and white LED chip, emitting green light, red light, blue light and while light respectively. To further improve the quality of the white light generated by the packed LED chips, four LED chips including a red LED chip (R), a green LED chip (G), a blue LED chip (B) and a white LED chip (W) are used. In addition, with the advancement of technology, LED chips of other colors can also achieve a uniform mixing of light. With the advancement of LED chip design, LED chips of a different number and/or a different color can also be used in the LED chip array to upgrade mixing of the light beams or to achieve different mixing effects of the light beams.

Accordingly, in the present embodiment, the light guiding surface 32 itself of the light pipe 3 is twisted such that the light beams of different wavelengths from the LED each can be respectively deflected to different degrees after entering the light pipe 3 to ultimately achieve a uniform mixing of the light beams.

In the present embodiment, the light guiding surface 32 of the light pipe 3 is twisted and the LED chips are rotated to a certain degree with respect to at least one set of other LED chips, so the light beams of different wavelengths from the LED each can be respectively deflected to a certain degree after entering the light pipe 3 and the emitting angles of the light beams of different wavelengths also vary. After the light beams are deflected having passed through the light pipe 3, the light beams of different wavelengths will affect each other and be deflected due to the difference of emitting angles, thereby achieving a uniform mixing of the light beams.

Further, the output surface 33 of the light pipe 3 can be circular.

Different from the input surface 31, the output surface 33 works to make the light beams deflected when passing the light guiding surface 32 to be emitted intensively after passing through the output surface 33 and make the emitted light beams more uniform. In some embodiments of the present invention, the output surface 33 is circular, making the emitted light beams more uniform.

Further, the cross sectional area of the light pipe 3 increases gradually from the input surface 31 to the output surface 33.

Since the cross sectional area of the light pipe 3 increases with the distance from the input surface of the light increasing, the light pipe 3 can be designed in segment or in integration. When designed in segment, each cross section of each segment can hold different shapes and/or cross sectional area; and when designed in integration, the light pipe 3 can generally change from large to small, to achieve concentration of light.

Embodiment 12

This embodiment is different from embodiment 11 in that the input surface 31 of the light pipe 3 is a hexagon and the output surface 33 of the light pipe 3 is a square. In addition, the deflection angles of the multiple light emitting arrays 21 with respect to the light axis are different, that is, the multiple light emitting arrays 21 are at different deflection angles to each other, including 90°, 180° and 270°. And the multiple light emitting arrays 21 are arranged to form a square shape. Under such arrangement, a better light mixing effect can be achieved.

Embodiment 13

This embodiment is different from embodiment 11 in that the deflection angles of the multiple light emitting arrays 21 with respect to the light axis are different, that is, the multiple light emitting arrays 21 are at different deflection angles to each other, including 90°, 180° and 270°. And the multiple light emitting arrays 21 are arranged to form a triangle shape. Under such three conditions, an even better light mixing effect can be achieved.

Embodiment 14

This embodiment is different from embodiment 11 in that, as shown in FIG. 9 and FIG. 13, the deflection angles of the multiple light emitting arrays with respect to the light axis are the same, that is, there is no deflection between the multiple light emitting arrays.

Embodiment 15

This embodiment is different from embodiment 11 in that the optical system further comprises a diffusion structure that is a frosted surface disposed on the output surface 33 of the light pipe 3 or is a diffuser disposed between the output surface 33 of the light pipe 3 and the lens.

Embodiment 16

This embodiment provides a light fixture. The light fixture can be a fixture for lighting, a stage lighting unit or an irradiating lamp, which can be used for lighting at home or in specific places, to achieve different lighting effects. The light fixture is implemented by employing the optical system in any of the embodiments 1 to 15.

Embodiment 17

Figure 14:
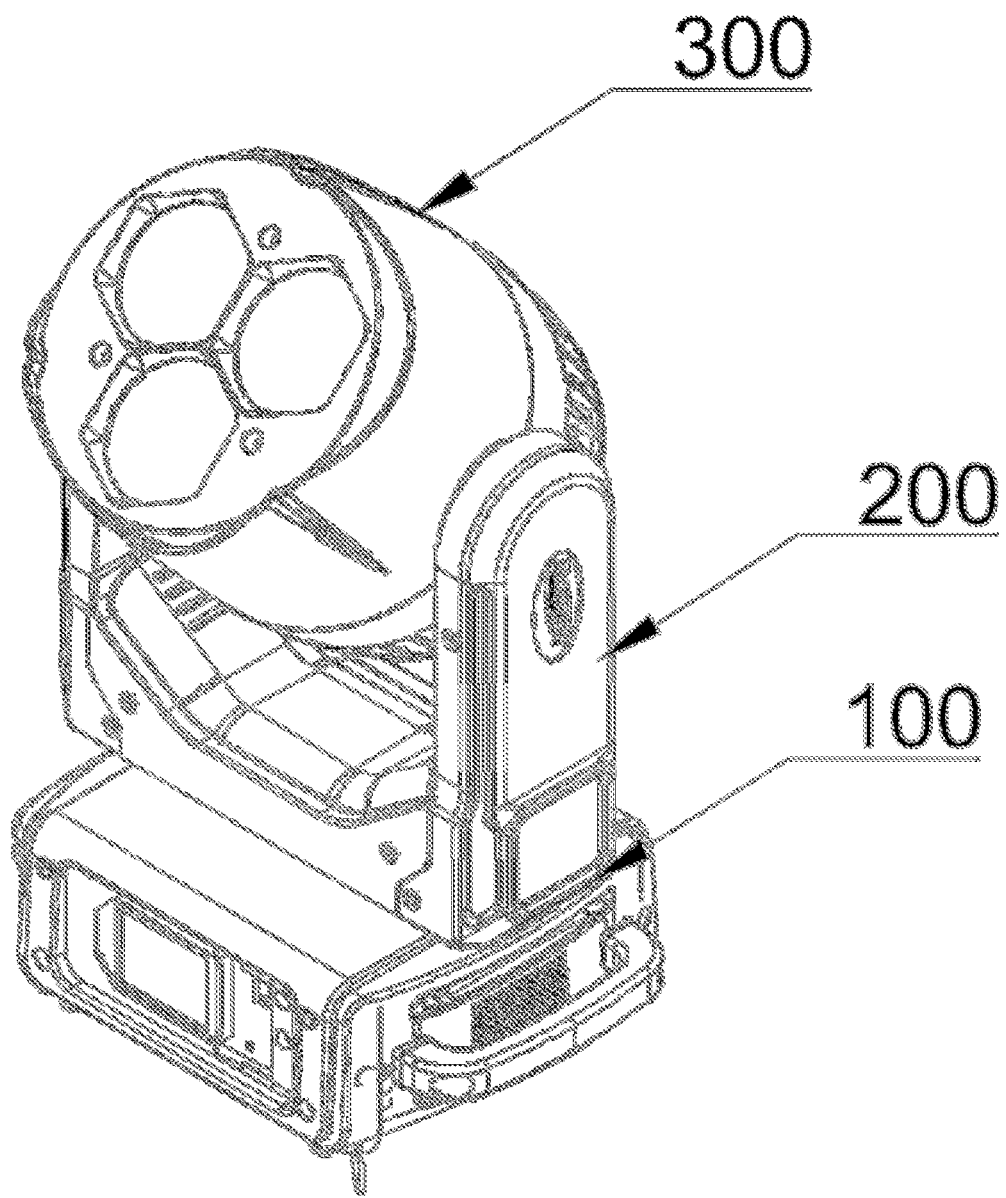
FIG. 14 is a perspective view of a light fixture according to the present invention.

This embodiment provides a light fixture. As shown in FIG. 14, the light fixture includes a base 100 and a support 200 mounted thereon. The support 200 is U typed and a light fixture component 300 is mounted thereon. The light fixture component 300 is rotatably connected to the support 200 so that the light fixture component 300 is capable of rotating vertically with respect to the support 200.

Figure 15:
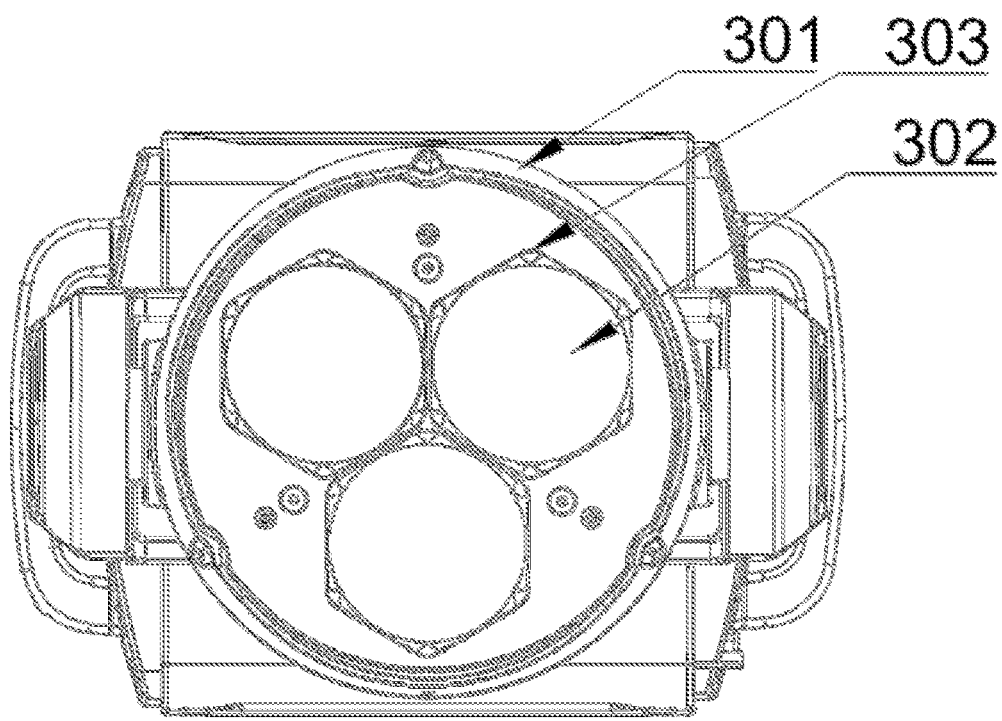
FIG. 15 is a top view of the light fixture according to the present invention.

As shown in FIG. 15, the light fixture component 300 includes a light support 301. Three light emitting lenses 302 are disposed on the top of the light support 301. Inside the light support 301, a set of the optical system in any of the embodiments 1 to 15 is arranged corresponding to one of the light emitting lenses, in which a honeycomb-like cover 303 is generally higher than the light emitting lens 302 to further prevent light crosstalking, thus achieving better light output.

Besides the light fixture consisting of three sets of optical systems in the present embodiment, a light fixture consisting of one set of the optical system, two sets of the optical systems or multiple sets of the optical systems can also be used as required, and in any case, good light fixing can be achieved and light crosstalking can be effectively prevented.

The above embodiments are only used to describe the technical solutions of the present invention rather than limiting them. Although the present invention has been described in detail with reference to foregoing embodiments, those of ordinary skill in the art should appreciate that modifications or equivalent substitutions will not depart from the spirit and scope of the technical solutions of the embodiments of the present application. Those skilled in the art can also make other modifications and the like in the spirit of the present invention for use in the design of the present invention as long as it does not depart from the technical effects of the present invention. All modifications made in accordance with the spirit of the invention shall fall within the scope of the invention.

The invention claimed is:

1. An optical system, comprising:
   a substrate;
   a light source mounted on the substrate and including multiple sets of light emitting arrays;
   a light pipe arranged corresponding to each set of the light emitting arrays, including an input surface, at least one light guiding surface and an output surface; and
   an optical lens,
   so that light emitted from the light emitting array enters the light pipe via the input surface and is outputted from the output surface through light homogenizing treatment by the light guiding surface, such light out of the light pipe forming a light beam and being emitted via the optical lens,
   wherein the optical system further comprises a honeycomb-like cover including multiple through holes, each through hole sleeved on each lens of the optical lens, a cross section of the through hole matching with a maximum cross section of the lens of the optical lens, and an overall shape of the through holes arranged on the honeycomb-like cover matching with an overall shape of the light source arranged on the substrate; and
   wherein the honeycomb-like cover includes an upper honeycomb-like cover and a lower honeycomb-like cover, of which the lower honeycomb-like cover is proximal to the light source and has an axial height of h1≥H−L/tan α, in which
   H means vertical distance between the lens of the optical lens and the output surface of the light pipe;
   L means half of a center distance between intermediate points of two light pipes; and
   α means half of a divergence angle of the output surface of the light pipe.

2. The optical system according to claim 1, wherein a part of the lens having the largest cross section is attached and fixed to the through hole seamlessly.

3. A light fixture, wherein the light fixture includes the optical system according to claim 1.

4. The optical system according to claim 1, wherein the axial height of the upper honeycomb-like cover is between 8 mm and 45 mm.

5. The optical system according to claim 1 further comprising:
   a diffusion structure being a frosted surface disposed on the output surface of the light pipe or being a diffuser disposed between the lens and the output surface of the light pipe.

6. The optical system according to claim 1, wherein there is a deflection angle of the light emitting array with respect to at least one set of other light emitting arrays, such that after light beams of the light source are treated by the light pipe, a plurality of light beams emitted have an offset and generate a uniform pattern; and the deflection angle is β, which is between 0° and 360°.

7. The optical system according to claim 1, wherein the light emitting arrays are arranged in the same direction.

8. The optical system according to claim 1, wherein at least a portion of the light guiding surface of the light pipe is provided with a twist structure, such that the light beams emitted from the light source can generate a uniform pattern after the light beams of light source are treated by the light pipe having the twist structure; and when the light pipe is twisted, a deflection angle of the output surface of the light pipe with respect to the input surface is γ, which is between 0° and 90°.

9. The optical system according to claim 8, wherein when the light pipe is the twist structure, or at least a portion of the light guiding surface is provided with the twist structure, the twist structure is an axial twist structure in which the light guiding surface is at a certain angle to the light axis.

10. The optical system according to claim 1, wherein the input surface is in any shape and the output surface of the light pipe is a circular shape or a regular 2n-side polygon shape, n being a natural number larger than 1.

11. The optical system according to claim 1, wherein the input surface of the light pipe is square or rectangular.

12. The optical system according to claim 6, wherein the deflection angle is 90° and/or 180° and/or 270°.

13. The optical system according to claim 9, wherein the axial twist structure is a spiral twist structure.

14. The optical system according to claim 9, wherein the axial twist structure is a rib-typed twist structure.

15. The optical system according to claim 14, wherein the rib-typed twist structure is a structure of spiral twist in a direction from an input end to an output end of the light source; the rib of the rib-typed twist structure deflects at an angle δ with respect to the light axis, δ is between 0° and 90°; and height of the twist is approximately half of a total length of the light guiding surface.

16. The optical system according to claim 1, wherein an overall shape of the multiple sets of light emitting arrays arranged on the substrate is triangle, square, rectangular, regular hexagonal, regular octagonal, circular or circular-like, and the overall shape of the through holes arranged on the honeycomb-like cover is triangle, square, rectangular, regular hexagonal, regular octagonal, circular or circular-like.

17. The optical system according to claim 9, wherein the axial twist structure is a textured twist structure that is the light guiding surface has a twist texture in a direction from the input end to the output end of the light source.

18. The optical system according to claim 8, wherein the twist structure of the light pipe includes a structure in which multiple light pipes are rotated at a certain angle with respect to one or more other light pipes.

19. The optical system according to claim 1, wherein the light emitting array is an LED chip array; the output surface of the light pipe is circular or circular-like; and a cross sectional area of the light pipe increases gradually from the input surface to the output surface.

* * * * *